US007055231B1

(12) United States Patent
Blachley

(10) Patent No.: US 7,055,231 B1
(45) **Date of Patent: *Jun. 6, 2006**

(54) METHOD OF MANUFACTURING A PREFINISHED FIBERBOARD SHUTTER

(76) Inventor: David Blachley, 1967A N. Glassell, Huntington Beach, CA (US) 92865

( * ) Notice: Subject to any disclaimer, the term of this patent is extended or adjusted under 35 U.S.C. 154(b) by 185 days.

This patent is subject to a terminal disclaimer.

(21) Appl. No.: 10/623,242

(22) Filed: Jul. 17, 2003

Related U.S. Application Data

(63) Continuation of application No. 09/954,541, filed on Sep. 15, 2001, now Pat. No. 6,622,433.

(60) Provisional application No. 60/233,307, filed on Sep. 15, 2000.

(51) Int. Cl.
*B23P 17/00* (2006.01)

(52) U.S. Cl. ............................ 29/412; 29/434; 29/558

(58) Field of Classification Search ................ 29/24.5, 29/412, 415, 416, 417, 434, 558
See application file for complete search history.

(56) References Cited

U.S. PATENT DOCUMENTS

| | | | | |
|---|---|---|---|---|
| 1,639,474 A * | 8/1927 | Whitmore | 160/236 |
| 2,091,012 A * | 8/1937 | Pratt | 160/232 |
| 3,324,785 A * | 6/1967 | Underdahl | 454/278 |
| 3,491,481 A | 1/1970 | Wunderlick | |
| 4,276,954 A * | 7/1981 | Romano | 181/224 |
| 4,380,857 A | 4/1983 | Senuma et al. | |
| 4,936,048 A * | 6/1990 | Ruggles | 49/74.1 |
| 5,020,276 A * | 6/1991 | Zittell | 49/87.1 |
| 5,121,785 A * | 6/1992 | Ohsumi | 160/236 |
| 5,194,310 A | 3/1993 | Lenderink | |
| 5,483,873 A | 1/1996 | Koivukunnas et al. | |
| 5,490,353 A | 2/1996 | McLaughlin | |
| 5,630,295 A | 5/1997 | Neiman | |
| 5,778,598 A | 7/1998 | Ohanesian | |
| 5,887,386 A | 3/1999 | Alexanian et al. | |
| 5,996,672 A | 12/1999 | Kotin | |
| 6,125,906 A | 10/2000 | Kotin | |
| 6,145,251 A | 11/2000 | Ricci | |
| 6,192,964 B1 * | 2/2001 | Cianci et al. | 160/173 R |
| 6,219,985 B1 * | 4/2001 | Hsu | 52/473 |
| 6,314,680 B1 | 11/2001 | Buckwalter et al. | |
| 6,401,391 B1 | 6/2002 | Gabriele | |
| 6,467,219 B1 | 10/2002 | Bardner | |
| 6,655,091 B1 * | 12/2003 | Iwasaki | 49/403 |
| 6,732,475 B1 * | 5/2004 | Lee | 49/505 |
| 6,769,472 B1 * | 8/2004 | Lee | 160/236 |
| 6,810,619 B1 * | 11/2004 | Wilson | 49/74.1 |
| 6,854,211 B1 * | 2/2005 | Blachley | 49/82.1 |
| 2001/0004004 A1 * | 6/2001 | Levy et al. | 160/236 |
| 2002/0056183 A1 * | 5/2002 | McGlinchy | 29/417 |
| 2002/0062545 A1 * | 5/2002 | Niedermair | 29/417 |
| 2004/0140062 A1 * | 7/2004 | Lee | 160/117 |

* cited by examiner

*Primary Examiner*—David P. Bryant
(74) *Attorney, Agent, or Firm*—Law Office of Glenn R. Smith; Glenn R. Smith; Lei Liu

(57) ABSTRACT

A shutter manufacturing method provides a coated manufactured wood substrate sheet. A plurality of attached shutter components are identified. The attached shutter components are configured edge-to-edge and end-to-end so as to comprise the substrate sheet. The attached shutter components are separated into a plurality of prefinished shutter components, and the prefinished shutter components are incorporated into a shutter assembly.

10 Claims, 23 Drawing Sheets

DETAIL A

METHOD OF MANUFACTURING A PREFINISHED FIBERBOARD SHUTTER

CROSS-REFERENCE TO RELATED APPLICATIONS

This application is a continuation of prior U.S. patent application Ser. No. 09/954,541 filed Sep. 15, 2001, now U.S. Pat. No. 6,622,433, entitled Prefinished Medium Density Fiberboard Shutter, which relates to and claims the benefit of prior U.S. Provisional Application No. 60/233,307 entitled Pre-Coated Medium Density Fiberboard Shutter, filed Sep. 15, 2000, both prior applications incorporated by reference herein.

BACKGROUND OF THE INVENTION

Shutters are a high quality interior window treatment, having a combination of style, functionality and elegance that sets them apart from other window coverings. Shutters provide warmth in the winter and protect from damaging heat and sunlight in the summer. Shutters also provide complete control of view, privacy and light. Conventional shutters are made of an indigenous wood such as popular, oak or ash. The shutter components are typically assembled using doweling, screws and staples. After assembly, the shutters are stained or painted.

SUMMARY OF THE INVENTION

The basic shutter manufacturing process described above may have been in use for hundreds of years or more. This process, however, has various disadvantages. Shutters manufactured using a "coat after assembly" method are costly to produce, and conventional finishes used in the shutter industry, such as spray paint, can scratch, mar, and smudge during the assembly process, rendering pre-coating impractical. Further, indigenous woods are relatively expensive, and shutters manufactured from indigenous woods are costly to prepare for assembly and are not amenable to modern coating processes. In addition, conventional coatings on indigenous wood are easily damaged during installation and use and are difficult to clean.

To overcome some of these disadvantages of conventional shutters, a shutter according to the present invention is finished before assembly. This prefinishing process uses laminates that resist damage during and after assembly and that are easy to clean using standard household products. The lamination processes are largely automated and performed in bulk, reducing manufacturing time and costs. The shutter according to the present invention also utilizes a composite, manufactured wood made of medium density fiberboard (MDF) material. MDF is a less expensive material than indigenous wood and less costly to prepare. MDF has a suitable surface for modern laminates and is durable enough during assembly to allow prefinishing.

Attempting to assemble shutters from MDF utilizing conventional attachment techniques, such as dowels, screws and staples, however, is problematic due to the tendency of MDF to crack and split. Further, MDF warps and bows with a degree of deflection dependent on the size of the material used. As a result, large, unsightly gaps can develop in installed shutters made from MDF. These inherent problems with MDF have been a barrier to the use of MDF in the shutter industry.

To overcome the disadvantages of MDF shutter construction, a shutter according to the present invention utilizes tongue and groove construction for assembly of shutter components, significantly reducing the cracking and splitting of the MDF material. Further, the shutter is constructed with a louver tension control that also functions as a frame stabilizer, significantly reducing the warping and bowing of the MDF material. Advantageously, the tongue and groove assembly and the frame stabilizer allow shutters to be constructed with thinner than conventional material, further reducing costs. In addition, links for attaching a tilt bar with louvers are inserted using predrilled holes and glue rather than a conventional staple gun, also reducing the cracking and splitting of the MDF material. These assembly techniques allow MDF to be used as the primary material, overcoming inherent problems to achieve the end result of a quality shutter.

One aspect of a shutter manufacturing method comprises the steps of providing a coated manufactured wood substrate sheet and identifying a plurality of attached shutter components configured edge-to-edge and end-to-end so as to comprise the substrate sheet. Additional steps include separating the attached shutter components into a plurality of prefinished shutter components and incorporating the prefinished shutter components into a shutter assembly. In one embodiment the separating step comprises the further steps of cutting along edge portions of the attached shutter components and cutting along end portions of the attached shutter components. Additional steps may include milling the edge portions of the attached shutter components, coating the edge portions of the attached shutter components, and coating the end portions so as to provide a plurality of generally planar, prefinished louvers.

Another aspect of a shutter manufacturing method comprises the steps of defining a plurality of attached stile components comprising a common substrate, where the attached stile components have opposing faces and inside edges, and laminating the faces on the common substrate with a first laminate so as to create a finished substrate. Additional steps include cutting the finished substrate so as to create full grooves along the inside edges, separating the attached stile components into a plurality of prefinished stiles, and assembling a shutter frame with the prefinished stiles. One embodiment further comprises the step of installing a plurality of elongated, flexible inserts into the full grooves of the prefinished stiles, where the inserts define pin holes along the length of the inserts.

Additional steps may include constructing a plurality of flexible end caps each having one of a plurality of stile buttons and snapping the stile buttons into the pin holes so as to install the end caps along the length of the stiles. Further steps of a shutter manufacturing method may also include defining a plurality of attached louver components comprising a second common substrate, where the attached louver components have opposing louver faces, opposing louver edges and opposing louver ends, laminating the second common substrate with the laminate so as to finish the louver faces, milling the second common substrate so as to shape the louver edges, laminating the second common substrate with a second laminate so as to finish the louver edges, and separating the attached louver components into a plurality of prefinished louvers. An additional step may include removably attaching the louver ends to corresponding ones of the end caps so as to install the louvers within the shutter frame. Other steps may include constructing an elongated, flexible link bar defining a plurality of link bar holes along the length of the link bar, configuring the end caps each with one of a plurality of link bar buttons, and snapping the link bar buttons into corresponding ones of the link bar holes so as to interconnect the louvers.

A further aspect of a shutter manufacturing method comprises the steps of applying a first laminate to a surface of a substrate to form a laminated sheet, cutting the laminated sheet to a predetermined width to form a laminated board, cutting the laminated board to a predetermined length to form a prefinished shutter component, and assembling the prefinished shutter component into a shutter. One embodiment further comprises the steps of cutting the laminated sheet at the predetermined width to form a second laminated board, cutting one of the laminated board and the second laminated board at the predetermined length to form a second prefinished shutter component, and assembling the second prefinished shutter component into the shutter. Another embodiment comprises the further steps of milling an edge of the laminated board to form a milled edge and applying a second laminate to the milled edge. In a particular embodiment, the substrate is manufactured wood and the prefinished shutter component is a generally planar louver. A further step may include drilling a link hole into the milled edge and gluing a link into the link hole.

DETAILED DESCRIPTION OF THE PREFERRED EMBODIMENTS

Shutter Overview

Figure 1:
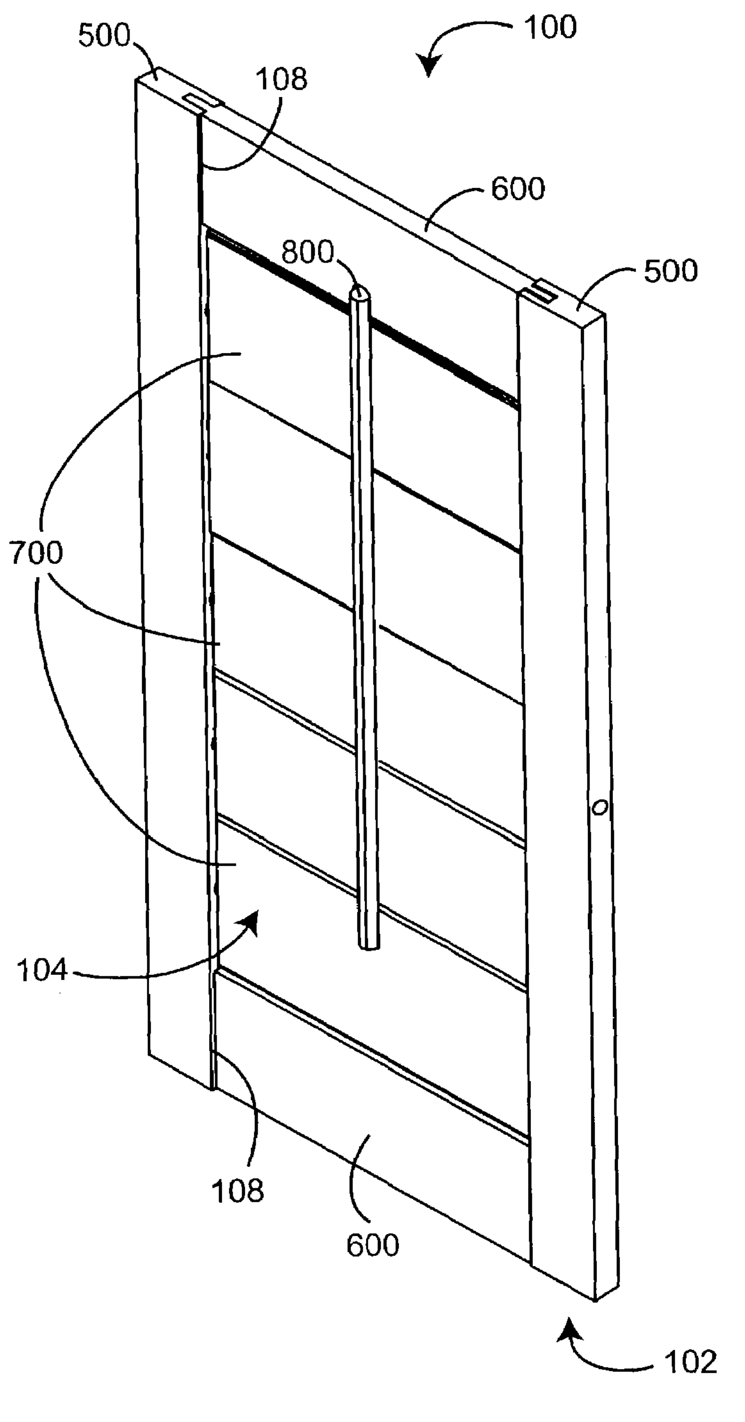
FIG. 1 is a perspective view of a prefinished, medium density fiberboard (MDF) shutter.

FIG. 1 illustrates an assembled, prefinished, medium density fiberboard (MDF) shutter 100. The shutter 100 is installable within a window opening and operable to control the amount of light entering a building interior and to maintain the privacy of the building occupants, in a manner that is well known in the art. The shutter 100 has stiles 500, spreaders 600, louvers 700 and a tilt bar 800. In the embodiment shown, the stiles 500 are fixedly attached to the spreaders 600 so as to form a shutter frame 102 having a generally rectangular opening 104. One of ordinary skill in the art will recognize that shutter embodiments having non-rectangular openings to accommodate windows of various sizes and shapes can be constructed using the materials and processes described herein.

As shown in FIG. 1, the louvers 700 are rotatably mounted to the stiles 500 within the frame 102. The tilt bar 800 is linked to the leading edges of the louvers 700 and operable up and down so as to rotate the louvers to various positions. The shutter 100 has a closed position (shown) with the tilt bar 800 in a fully up position and the louvers 700 overlapping along the edges so as to block light from passing through the opening 102. The shutter 100 also has various open positions (not shown) with the tilt bar 800 positioned away from the fully up position and the louvers 700 rotated away from the plane of the opening 102 so as to allow light to pass.

Figure 2:
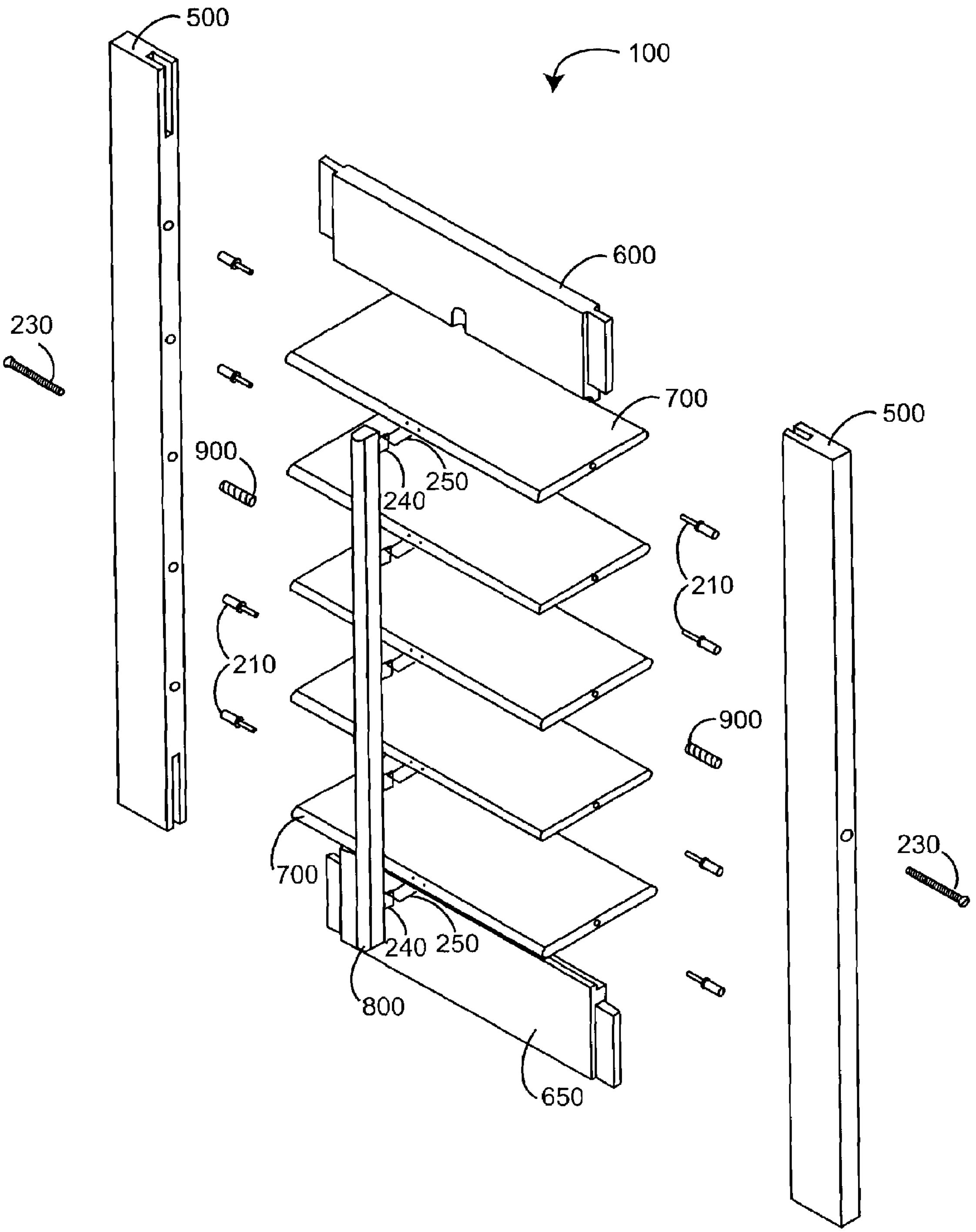
FIG. 2 is an exploded perspective view of a prefinished MDF shutter.

FIG. 2 shows a shutter 100 in exploded perspective view, further illustrating the various shutter components. A pair of stiles 500, a top spreader 600 and a bottom spreader 650 are mutually attached using tongue and groove construction to form a shutter frame 102 (FIG. 1). The stiles 500 are described in detail with respect to FIGS. 5A–D, below. The spreaders 600, 650 are described in detail with respect to FIGS. 6A–E, below. The louvers 700 are rotatably mounted to the stiles 500 using standard louver pins 210, such as Sullivan part #F9020W, which is a 1" plastic pin with a $\frac{1}{8}$" dia.×$\frac{5}{8}$" stake portion including a $\frac{1}{32}$" spacer that is press-fit into a louver 700 and a $\frac{1}{4}$" dia.×$\frac{3}{8}$" cylindrical portion that rotates within a stile 500.

As shown in FIG. 2, one or more selected louvers 700 receive an anchor 900 instead of a louver pin 210. Each louver 700 having anchors 900 is rotatably mounted to the stiles 500 with a pair of standard 8-32×2" roundhead screws 230. The anchors 900 and screws 230 advantageously function both as an adjustable louver tension control and a frame stabilizer. The anchors 900 and the associated tension control and frame stabilization mechanisms are described in detail with respect to FIGS. 9A–B, below. The tilt bar 800 is attached to an edge of each of the louvers 700 with an interlocked tilt bar link 240 and louver link 250, such as a 1"×$\frac{1}{4}$"×$\frac{1}{16}$" dia. wire staple and a $\frac{3}{4}$"×$\frac{1}{4}$"×$\frac{1}{16}$" dia. wire staple. Prefinishing and construction of the shutter components is described in detail with respect to FIG. 10A, below. Assembly of the shutter components is described in detail with respect to FIG. 10B, below.

Figure 3:
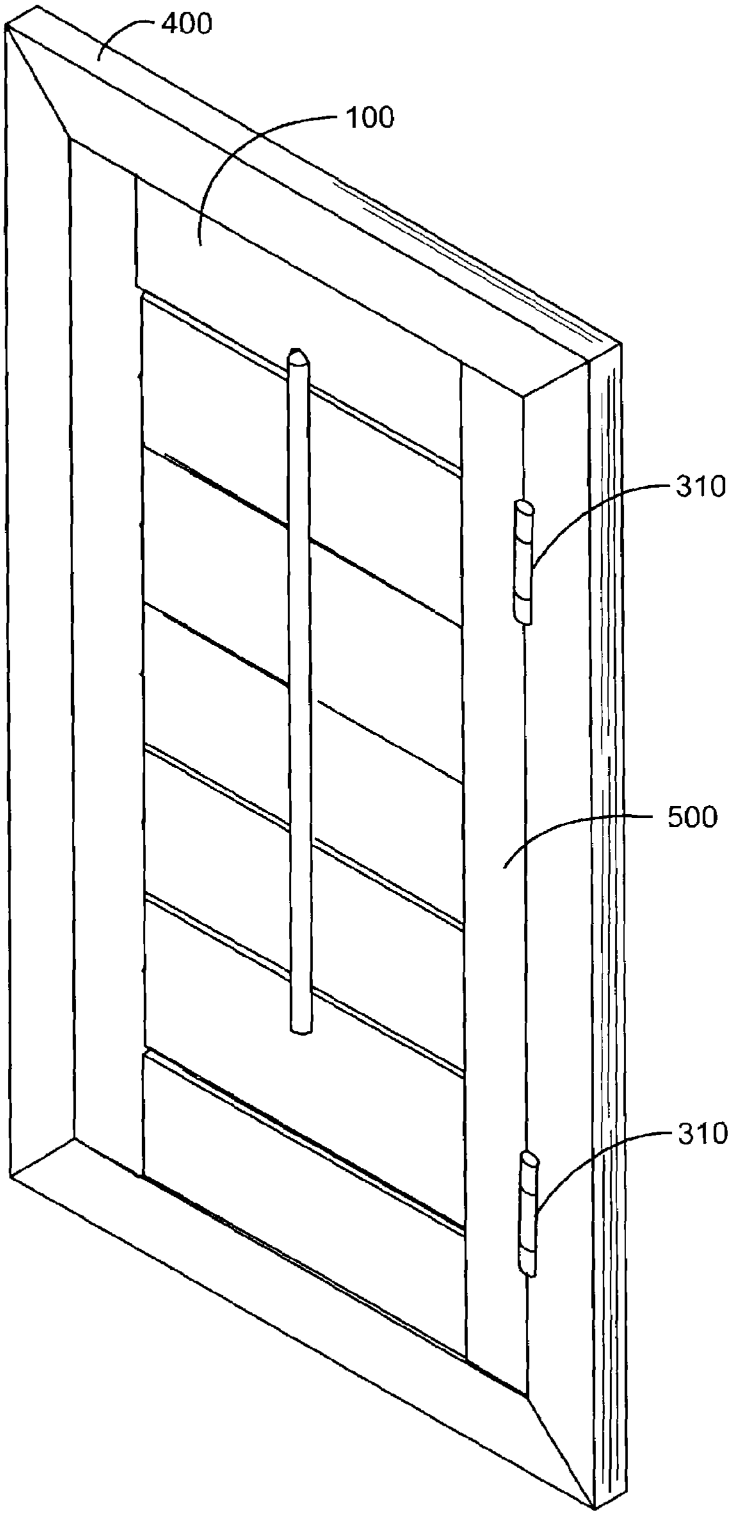
FIG. 3 is a front perspective view of a prefinished MDF shutter mounted within a window frame.
Figure 4:
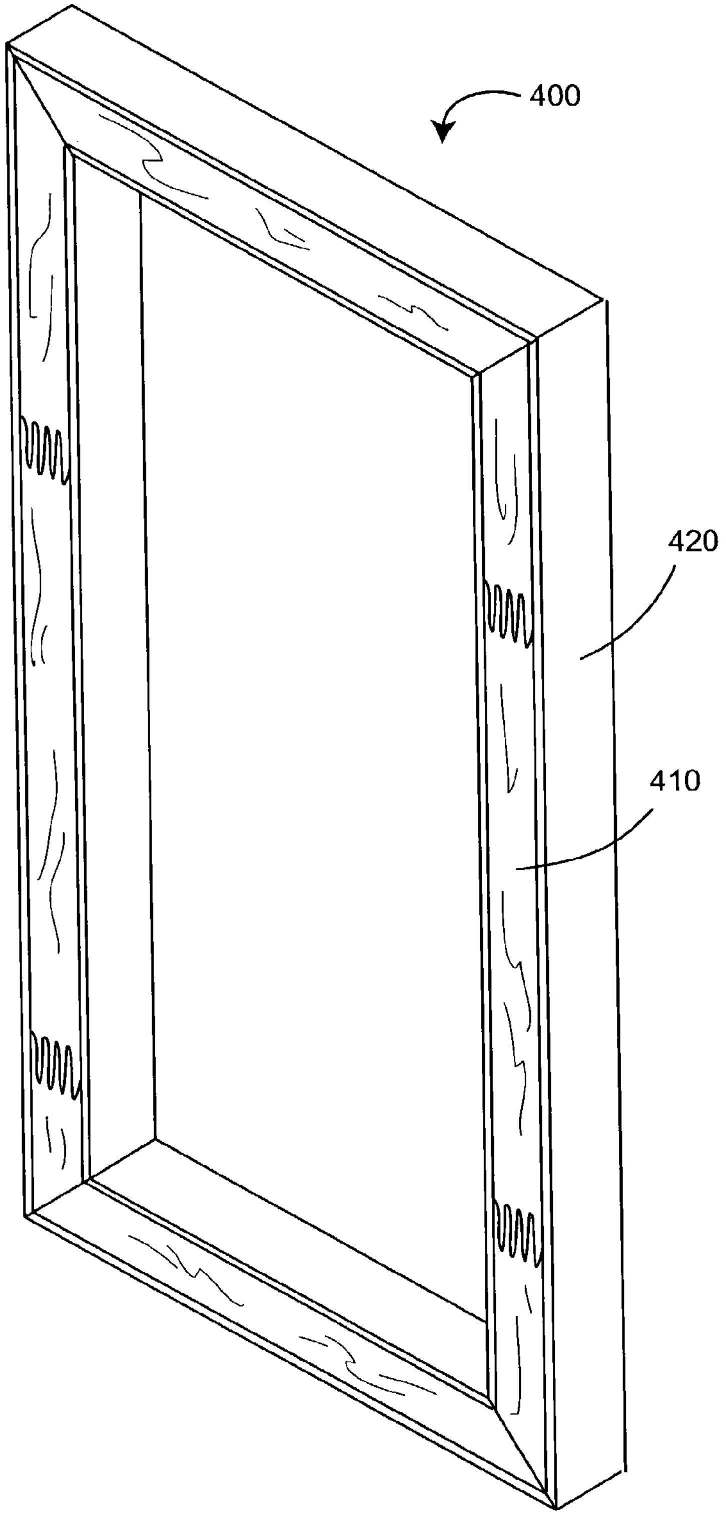
FIG. 4 is a back perspective view of a finger-jointed, natural wood window frame, such as shown in FIG. 3.

FIGS. 3–4 illustrate a window frame 400. FIG. 3 is a front, perspective view illustrating a shutter 100 mounted within a window frame 400. FIG. 4 is a back, perspective view illustrating one embodiment of a prefinished window frame 400 utilizing finger-jointed, natural wood. As shown in FIG. 3, a shutter 100 is attached to a window frame 400 with hinges 310 mounted to the window frame 400 and one of the stiles 500, allowing the shutter 100 to swing open or closed. As shown in FIG. 4, the window frame 400 has a finger-jointed, natural wood core 410 such as formed from 2', 3' or 4' pieces of poplar. The wood core 410 is partially finished with a profile wrap 420. The wrapped sections of the window frame 400 are attached at the corners with screws, nails or staples, as is well-known in the art.

Shutter Component Details

Stiles

FIGS. 5A–D illustrate a partial groove stile embodiment 500. A full groove stile embodiment 1400 (FIGS. 14A–G) is described with respect to FIGS. 14–16, below. A stile 500 is a generally elongated, planar shutter component having first and second faces 501, first and second ends 503, an outside edge 505 and an inside edge 507. A pair of stiles 500 form the sides to an assembled shutter frame 102 (FIG. 1), as described above, and extend vertically when a shutter 100 (FIG. 1) is installed in a conventional window. Stiles 500 provide mounts for the shutter louvers 700 (FIG. 1), as described with respect to FIGS. 1–2, above, and a structure for hinge attachment to a window frame 400 (FIG. 3), as described with respect to FIG. 3, above.

In one embodiment, a stile 500 is prefinished, having a substrate material with a first laminate applied to the stile faces 501 and a second laminate applied to the stile edges 505, 507. In a particular embodiment, the core material is medium density fiberboard (MDF), the first laminate is a decorative paper, such as US Coatings High Gloss OSS White, and the second laminate is a heat transfer foil, such as Kurtz part #C87046SR. The lamination process is described with respect to FIGS. 10–13, below.

Also shown in FIGS. 5A–D, a stile 500 has partial grooves 510 extending within each end 503 toward the opposite end 503 along the inside edge 507. The grooves 510 are configured to receive the spreader tongues 610 (FIGS. 6A–E). Also, a stile 500 has a number of pin holes 530 extending into the stile 500 perpendicularly from the inside edge 507 and spaced at regular intervals along the inside edge 507. The pin holes 530 are configured to receive a louver pin 210 (FIG. 2) for rotatably mounting a louver 700 (FIG. 2), as described with respect to FIGS. 1–2, above and FIG. 10B, below. Further, the stile 500 has one or more tension adjustment holes 550 extending into the stile 500 at a predetermined spacing along the outside edge 505. The adjustment holes 550 are configured to accept a tensioning screw 230 (FIG. 2) threaded into an adjustment hole 550, out a corresponding pin hole 530 and into an anchor 900 (FIG. 2), so that the head of the screw 230 (FIG. 2) is retained within the stile 500.

As shown in FIGS. 5A–D, the stile length is window frame dependent, which is a custom measurement for each installation. In a particular MDF embodiment, a stile width, i.e. across a face 501, is 2"–4" and a stile thickness, i.e. across an edge 505, 507, is ¾". A standard wood shutter typically is constructed with 1-¼" thickness boards for both stiles and spreaders. The stile 500 of the present invention is advantageously constructed of thinner MDF, i.e. in the range of ¾" to 1-¼", providing a shutter with comparable strength and less cost due to less material used. In this particular embodiment, a groove 510 is ¼"×¾" and corresponds to a spreader width. A pin hole 530 is ¼" dia.×⅜", and a tension adjustment hole 550 is ⅜" dia.

Spreaders

Figure 5A:
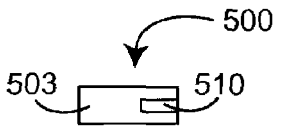
FIGS. 5A–D are end, outside edge, front and inside edge views, respectively, of a partial groove stile.
Figure 5B:
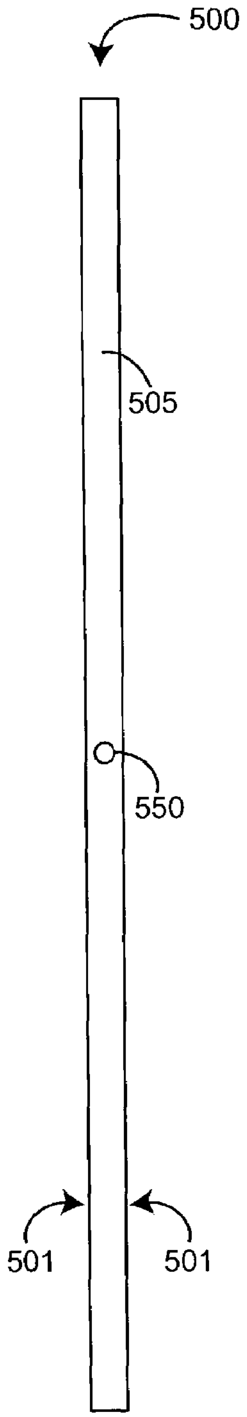
Figure 5C:
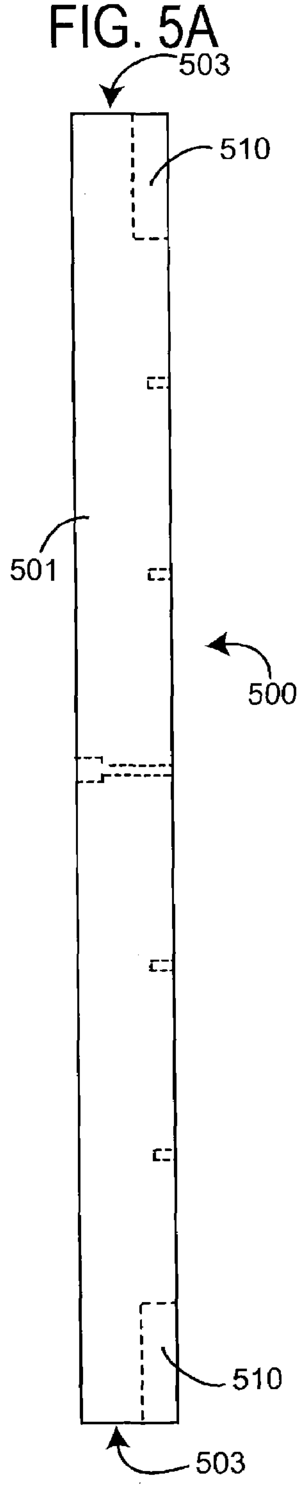
Figure 5D:
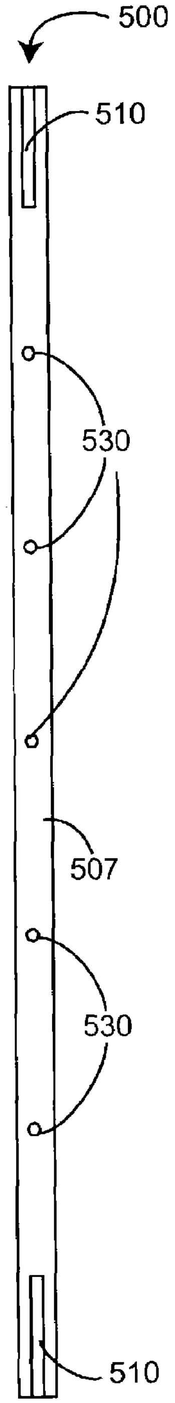
Figure 6A:
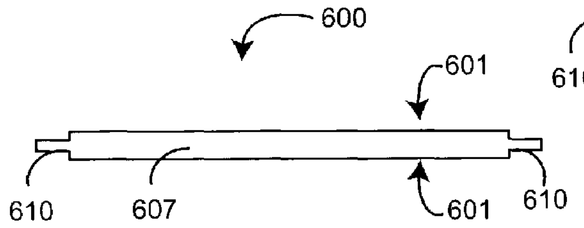
FIGS. 6A–E are outside edge, perspective, front, and end views of a top spreader, and a perspective view of a bottom spreader, respectively.
Figure 6B:
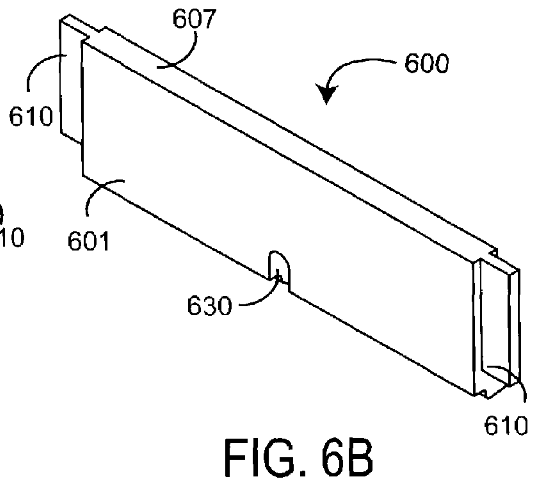
Figure 6C:
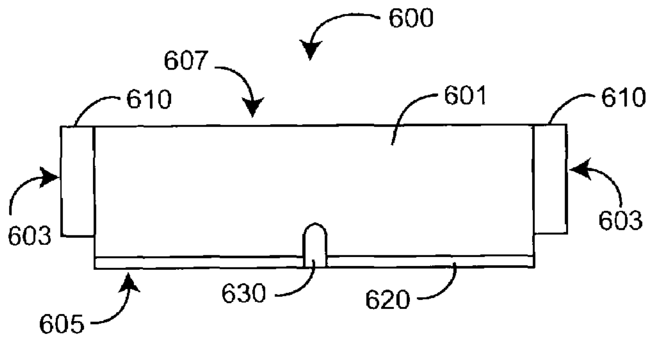
Figure 6D:
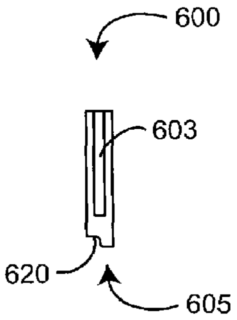
Figure 6E:
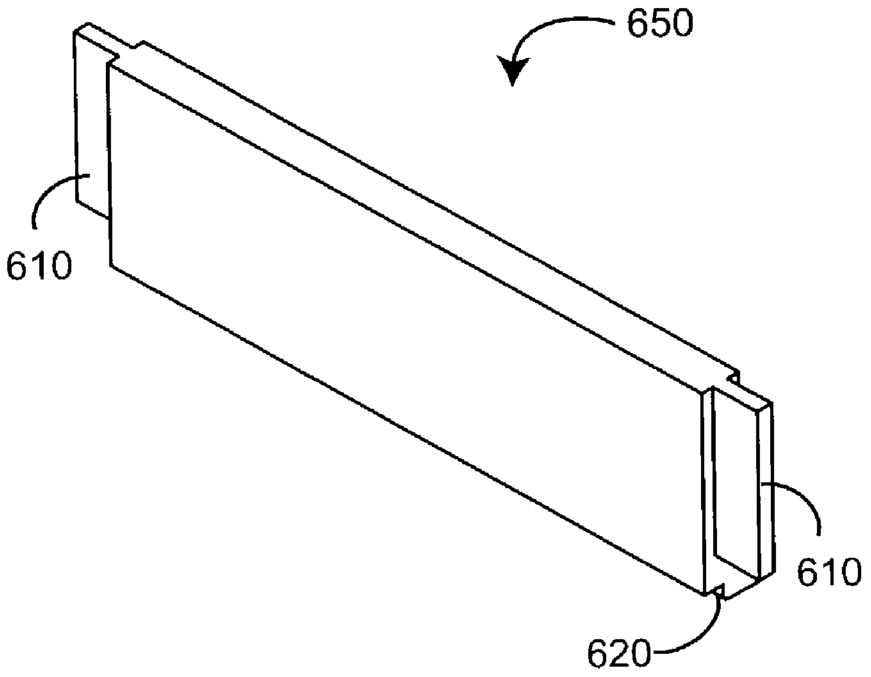

FIGS. 6A–E illustrate a spreader 600, 650. A spreader 600, 650 is a generally planar shutter component having first and second faces 601, first and second ends 603, a inside edge 605 and an outside edge 607. A top spreader 600 and a bottom spreader 650 (FIG. 6E) form the top and bottom of an assembled shutter frame 102 (FIG. 1), as described above, and extend horizontally when a shutter 100 (FIG. 1) is installed in a conventional window. A spreader 600, 650 has a shaped cutout 620 along the length of the inside edge 605 configured to accommodate a louver edge 705, 707 (FIGS. 7A–D) when the shutter 100 (FIG. 1) is closed. As shown in FIGS. 6A–D, a top spreader 600 has a notch 630 in one face 601 at the inside edge 605 generally centered between the ends 603. As shown in FIG. 6E, a bottom spreader 650 is identical to a top spreader 600 except that it does not have the notch 630 (FIGS. 6B–C). A top spreader 600 is installed in the shutter frame 102 (FIG. 1) with the cutout 620 proximate the tilt bar 800 (FIG. 1). The bottom spreader 650 (FIG. 6E) is installed in the shutter frame 102 (FIG. 1) with the cutout 620 distal the tilt bar 800 (FIG. 1). A spreader 600, 650 also has tongues 610 extending away from each end 603. The tongues 610 are configured to insert into the stile grooves 510 (FIGS. 5A–D).

In one embodiment, a spreader 600, 650 is prefinished, having a substrate material with a first laminate applied to the spreader faces 601 and a second laminate applied to the spreader inside edge 605. In a particular embodiment, the substrate material is medium density fiberboard (MDF), the first laminate is a decorative paper, and the second laminate is a heat transfer foil, as described with respect to FIGS. 5A–D, above. The lamination process is described with respect to FIGS. 10–13, below.

As shown in FIGS. 6A–E, the spreader length is window frame dependent, which is a custom measurement for each installation but less than 30" as determined by the louver length, as described with respect to FIGS. 7A–D, below. In a particular MDF embodiment a spreader width, i.e. across a face 601, is 2-½"–5" and a spreader thickness, i.e. across an edge 605, 607 is ⅝". Like a stile 500 (FIGS. 5A–D), in this particular embodiment a spreader 600, 650 is advantageously thinner, i.e. in the range of ⅝" to 1-¼", than a standard wood shutter typically constructed with 1-¼" thickness, providing a shutter with comparable strength and less cost due to less material used. In this particular embodiment a spreader 600, 650 is thinner than a stile 500 (FIGS. 5A–D), creating a ⅛" step 108 (FIG. 1) that advantageously disguises a stile-spreader seam between these two components. Also in this particular embodiment, a tongue is ¼"×¾" and extends most of the spreader width.

Louvers

FIGS. 7A–D illustrate a louver 700, which is a generally planar shutter component having first and second faces 701, first and second ends 703, a leading edge 705 and a trailing edge 707. Multiple louvers 700 are rotatably mounted within an assembled shutter frame 102 (FIG. 1) and extend horizontally between stiles 500 (FIG. 1) when a shutter 100 (FIG. 1) is installed in a conventional window. A louver 700 has a pin hole 710 generally centered at each end 703 and extending partially into the louver 700 along an axis of rotation. The pin hole 710 is configured to accept either a press-fit louver pin 210 (FIG. 2) or a screwed-in anchor 900 (FIG. 2). A louver 700 also has predrilled link holes 720 centered between the ends 703 along the leading edge 705. The link holes 720 are configured to accept a louver link 250 (FIG. 2). In one embodiment, a louver 700 is constructed of a substrate material with a first laminate applied to the louver faces 701 and a second laminate applied to the louver edges 705, 707. The second laminate may also be applied to the louver ends 703. In a particular embodiment, the substrate material is MDF, the first laminate is a decorative paper, and the second laminate is a heat transfer foil, as described with respect to FIGS. 5A–D, above. The lamination process is described with respect to FIGS. 10–13, below.

As shown in FIGS. 7A–D, the louver length is window frame dependent but less than about 30" when using MDF so as to advantageously avoid louver instability and wobble. In a particular embodiment, a width, i.e. across a face 701 is 2-½", 3-½" or 4-½", and a louver thickness, i.e. across an edge 705, 707 is ⅜". In this particular embodiment, a louver pin hole 710 is ⅛" dia.x⅝" and the link holes 720 are spaced ¼" apart and are 5/64" dia.x½".

Tilt Bar

FIGS. 8A–D illustrate a tilt bar 800. A tilt bar 800 is an elongated rod having a generally rectangular cross-section with rounded corners on a front edge 810 and square corners on a back edge 820 and sides 830. In one embodiment, the tilt bar 800 is constructed of 16' standard tilt rod natural wood stock, which is milled, sanded and prefinished with a profile wrap, such as used on the wood frame 400 (FIG. 4). The prefinished stock is cut to length, which is window frame dependent. In a particular embodiment, the back edge 820 is ½" and the side edges 830 are ⅝".

Frame Stabilizer

Figure 9A:
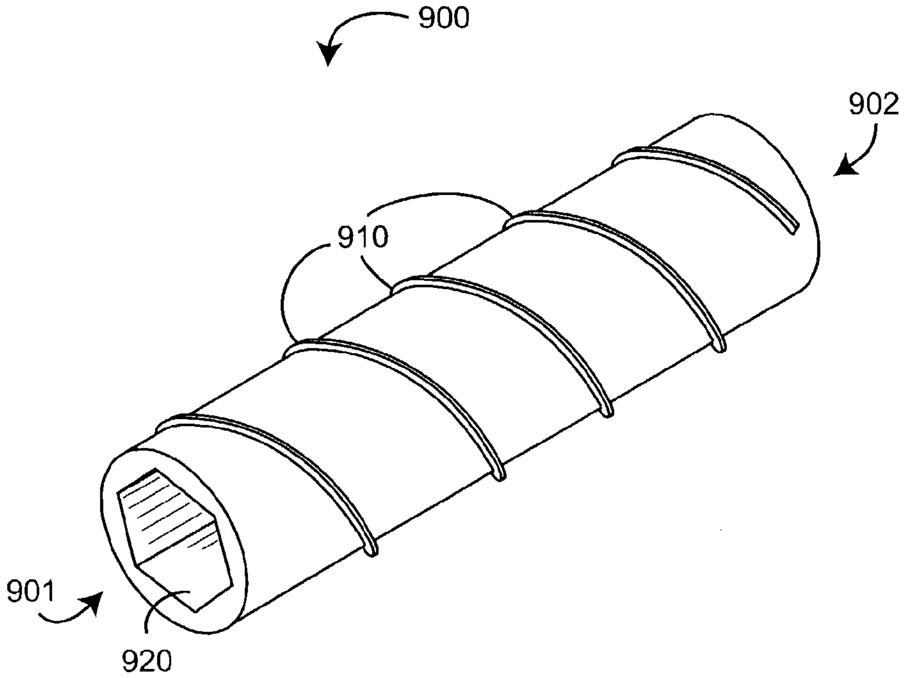
FIGS. 9A–B are front-end and back-end perspective views, respectively, of a threaded anchor for louver tension control and frame stabilization.
Figure 9B:
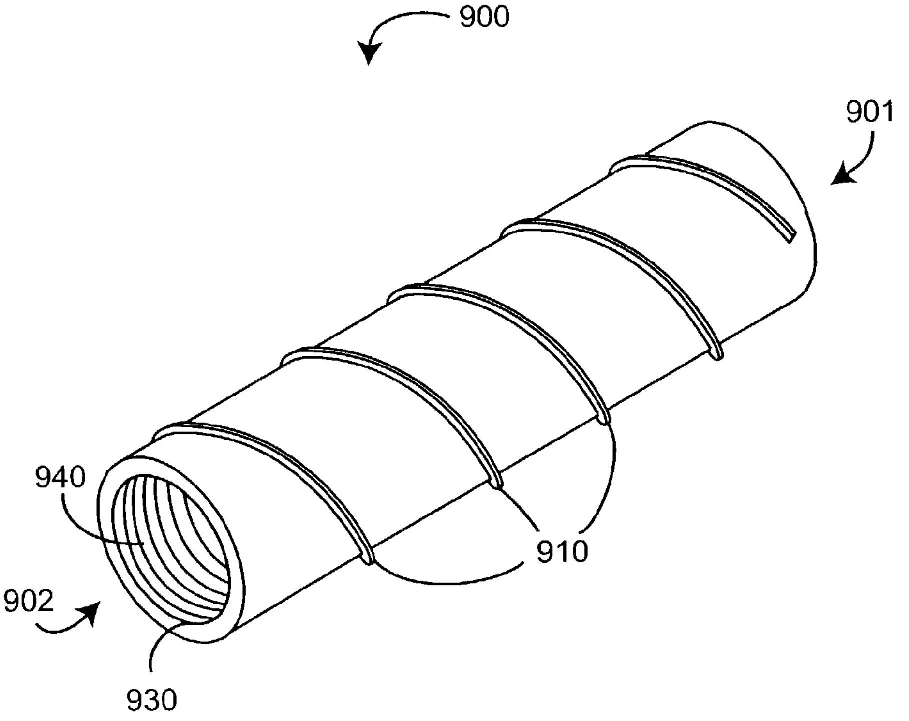

FIGS. 9A–B illustrate an anchor 900. The anchor 900 is a generally hollow cylinder having a socket end 901, a round end 902, coarse outer threads 910 and fine inner threads 940. The socket end 901 is utilized to drive the anchor 900 into a louver pin hole 710 (FIGS. 7A–D), so that the outer threads 910 cut into the pin hole 710 (FIGS. 7A–D). This, with the addition of glue, allows the anchor 900 to firmly grip inside the louver 700 (FIGS. 7A–D). The fine threads 940 accommodate the threads of the tensioning screw 230 (FIG. 2). In one embodiment, the anchor 900 has 3 to 12 coarse threads 910 and, in a particularly advantageous embodiment, the number of coarse threads 910 is at least 9 so as to prevent the anchor 900 from stripping from MDF louvers 700 (FIGS. 7A–D).

The anchor 900 and tensioning screw 230 (FIG. 2) advantageously function as both a louver tension control and frame stabilizer. Louver tension control determines the force required for the tilt bar to rotate the louvers. Traditional shutters provide tensioning with screws threaded directly into a selected louver. The tension is adjusted high enough so that the louvers maintain a particular position set with the tilt bar and low enough so that the louvers are easily repositioned. Such screws will quickly strip out of MDF louvers when sufficient operational tension is applied. The anchors 900 advantageously prevent the tensioning screw 230 (FIG. 2) from stripping out of a louver 700 (FIG. 2). Further, a shutter frame made of MDF is unstable in that it bows and warps. The anchors 900 advantageously allow sufficient tension to be distributed along the stiles 500 (FIG. 2) to reduce bowing and warping. The anchors 900 are inserted into one or more selected louvers at a predetermined spacing along the stiles 500 (FIG. 2). In one embodiment, the anchored louver spacing is no greater than about every 24" so as to advantageously provide sufficient and evenly distributed tension on the shutter frame 102 (FIG. 1).

Shutter Component Prefinishing

Figure 10A:
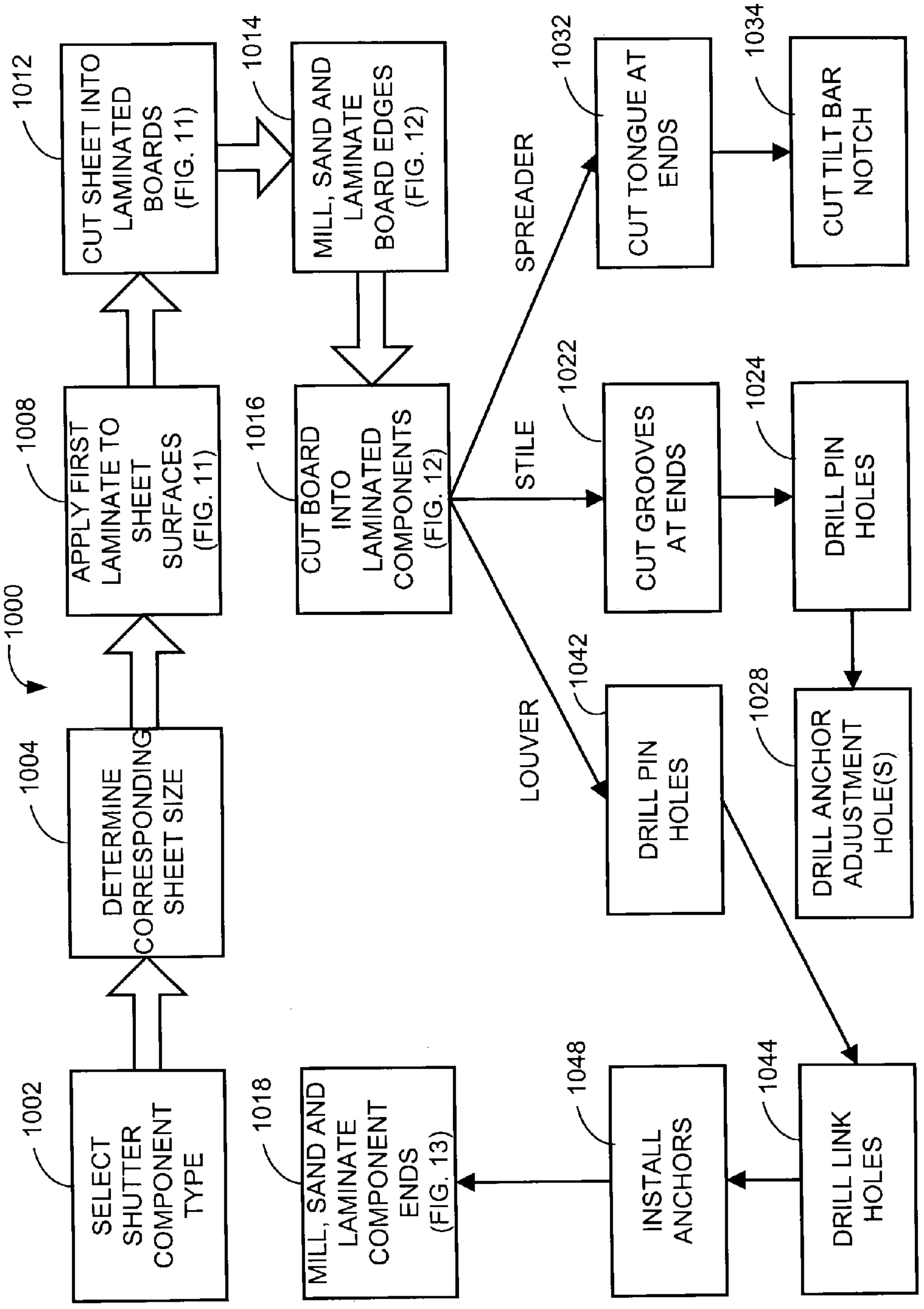
FIGS. 10A–B are flowcharts of a shutter component prefinishing process and a prefinished shutter assembly process, respectively.
Figure 10B:
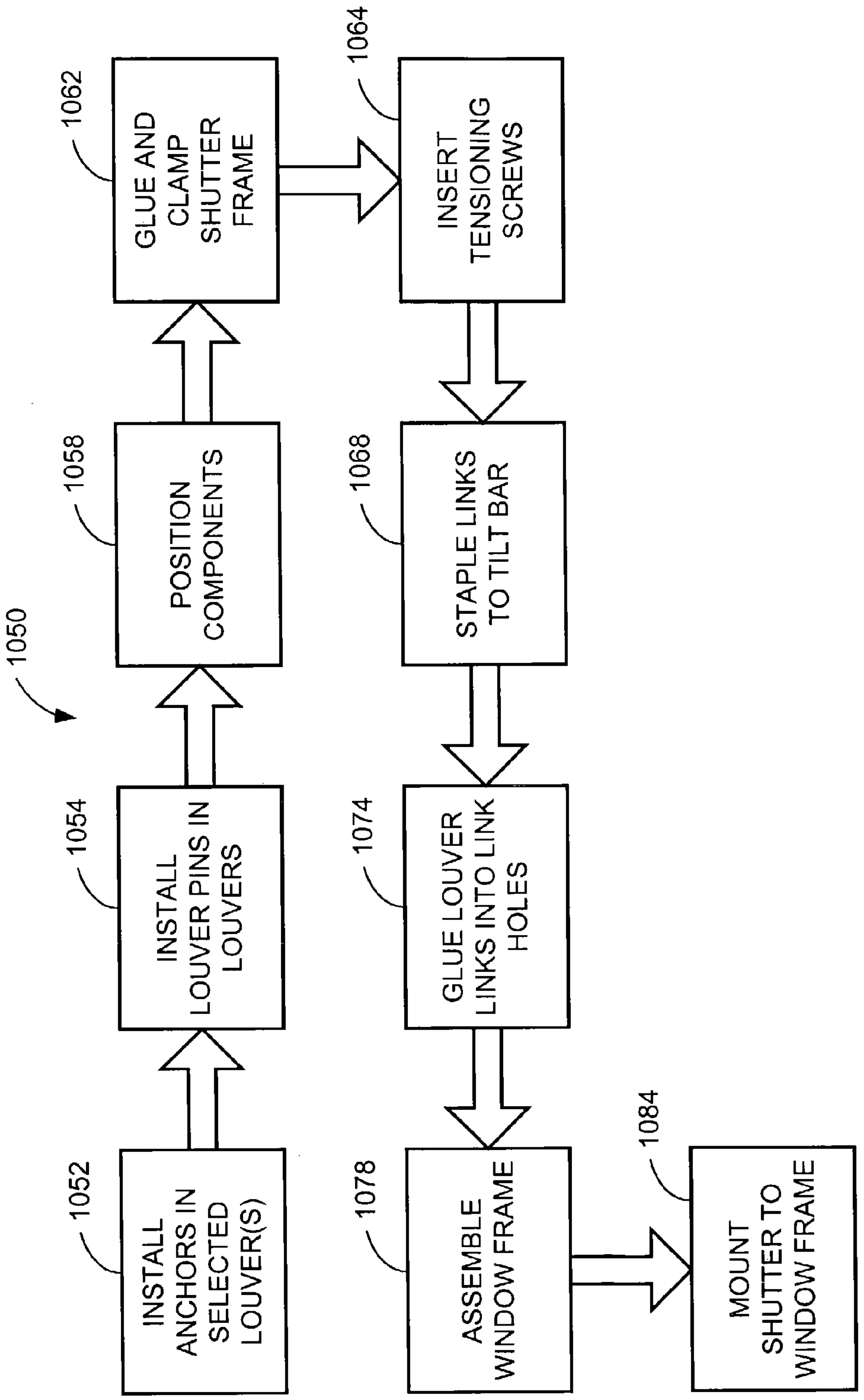

FIGS. 10A–B illustrate a shutter component prefinishing process and a prefinished shutter assembly process, respectively. As shown in FIG. 10A, an initial processing step is selecting a shutter component type 1002, which includes a stile 500 (FIG. 2), a spreader 600 (FIG. 2) and a louver 700 (FIG. 2), as described above. A next step is determining a substrate sheet size 1004. Advantageously, a substrate sheet may comprise multiple, edge-to-edge shutter components that are laminated in bulk and separated by cutting along edge portions, saving manufacturing steps. In one embodiment, standard 4'x8'x⅜" MDF sheets are used for louvers 700 (FIGS. 7A–D), 4'x10'x¾" MDF sheets are used for stiles 500 (FIGS. 5A–D) and 4'x8'x⅝" MDF sheets are used for spreaders 600 (FIGS. 6A–E), advantageously reducing wastage. Further steps are applying a first laminate to the planar surfaces of each sheet 1008 and cutting a laminated sheet into laminated boards 1012, as described in further detail with respect to FIG. 11, below.

Figure 11:
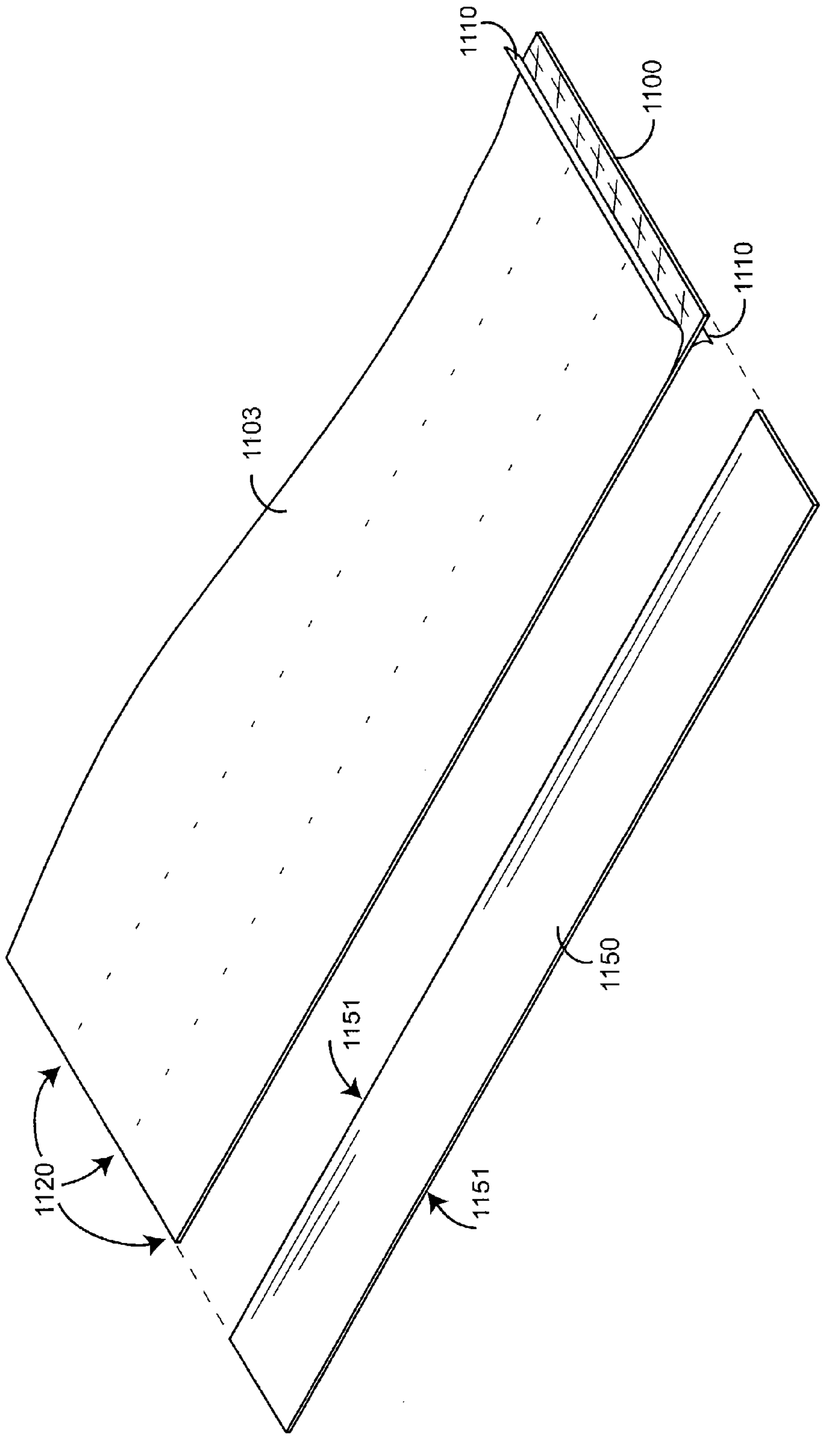
FIG. 11 is a perspective view of a laminated and cut substrate sheet.

FIG. 11 illustrates sheet lamination and cutting, which yield a laminated board 1150. An substrate 1100 is sandwiched between a first laminate 1110 to form a laminated sheet 1103. This may be accomplished with a hot roll laminator, such as a TB-60 from Black Bros. Co., Mendota, Ill. Laminated boards 1150 are then cut from the laminated sheet 1103 at predetermined widths 1120 corresponding to a particular shutter component. In one embodiment, the predetermined widths 1120 produce boards 1150 that are ⅛" wider than the final component width to allow for losses when the edges are milled and sanded, as described with respect to FIG. 12, below. For example, laminated boards 1150 of 2-⅝", 3-⅝" or 4-⅝" widths are cut for 2-½", 3-½" or 4-½" louvers 700 (FIGS. 7A–D), respectively.

Figure 12:
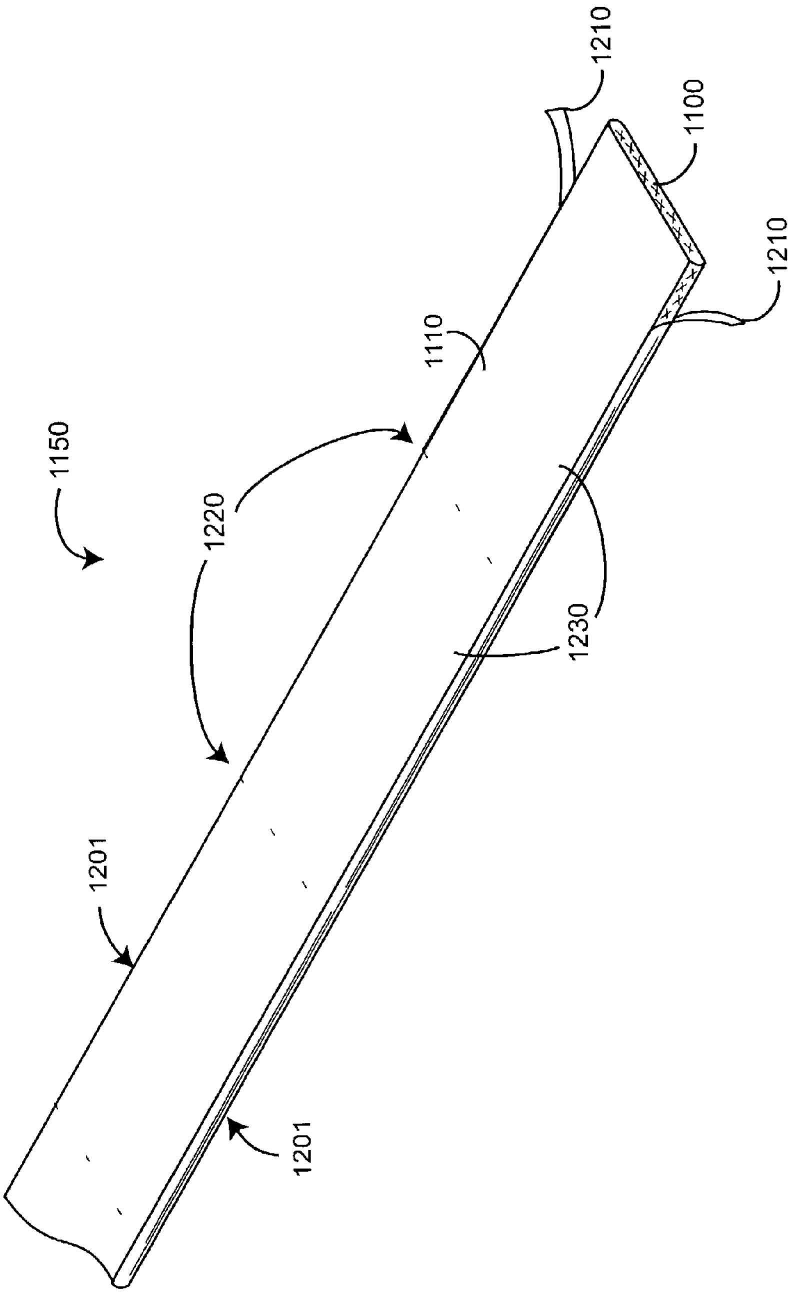
FIG. 12 is a perspective view of a laminated and cut substrate board.

As shown in FIG. 10A, additional processing steps include milling, sanding and laminating board edges 1014 and cutting a laminated board into laminated shutter components 1016, as described in further detail with respect to FIG. 12. Advantageously, a laminated board may comprise multiple, end-to-end shutter components that are laminated along previously cut edges in bulk and then separated by cutting along attached end portions, saving manufacturing steps. As shown in FIG. 12, a laminated board 1150 has edges 1151 (FIG. 11), one or both of which may be milled flat or to a particular shape to form a milled edge 1201 and then sanded accordingly. A second laminate 1210 is then applied to one or both milled edges 1201. This may be accomplished with a Voorwood L110 Edge Foiler, available from X-Factory, Charlotte, N.C. Nominally, the foiler temperature and pressure parameters are 320° F. and 1000 psi. Temperature may vary ±10° F. depending on material temperature, material thickness and humidity. Prefinished shutter components 1230 are cut from a laminated board 1150 at predetermined lengths 1220 corresponding to the custom measured length for a particular shutter component.

Also shown in FIG. 10A, additional steps are performed on a prefinished stile component. A cutting grooves at stile ends step 1022 forms the grooves 510 (FIGS. 5A–D) used for tongue and groove assembly of the shutter frame 102 (FIG. 1). A drilling pin holes step 1024 forms the stile pin holes 530 (FIG. 5D) that retain louver pins 210 (FIG. 2) or tensioning screws 230 (FIG. 2), as described above. A drilling adjustment hole(s) step 1028 forms the tension adjustment hole(s) 550 (FIG. 5B) for inserting and adjusting the tensioning screws 230 (FIG. 2), as described above.

Further shown in FIG. 10A, an additional step applied to a prefinished spreader component is cutting a tongue at the spreader ends 1032. The cutting a tongue step 1032 creates a tongue 610 (FIGS. 6A–E) for tongue and groove attachment of spreaders 600, 650 (FIG. 2) and stiles 500 (FIG. 2), as described with respect to FIG. 10B, below. Yet a further step applied to a top spreader 600 (FIGS. 6A–D) is cutting a tilt bar notch 1034. A tilt bar notch 630 (FIGS. 6B–C) is described with respect to FIGS. 6A–E, above. This step is eliminated for a bottom spreader 650 (FIG. 6E).

Further shown in FIG. 10A, additional steps are performed on a prefinished louver component. A drilling pin holes step 1042 forms the louver pin holes 710 (FIGS. 7B, 7D) that retain louver pins 210 (FIG. 2) or anchors 900 (FIG. 2), as described above. A drilling link holes step 1044 forms the predrilled link holes 720 (FIGS. 7A–B) that advantageously allow a louver link 250 (FIG. 2) to be inserted into a louver 700 (FIGS. 7A–D) without splitting, as described above and further with respect to FIG. 10B, below. An installing anchors step 1048 inserts an anchor 900 (FIG. 2) into the pin holes 710 (FIGS. 7B, 7D) of selected louvers 700 (FIGS. 7A–D), providing tension control and frame stabilization, as described with respect to FIGS. 9A–B, above.

A drilling jig (not shown) for pre-drilling the louver link holes 720 (FIGS. 7A–D) can be used. The conventional method of attaching the tilt bar to each louver is to use a staple attached to both the tilt bar and the louver, each being placed only ¼" or so out from the respective surfaces. The conventional method of staple attachment is to fire staples from a gun in rapid succession, which typically crack or split the louver. The louver is then patched and painted over during a post-finishing process. A barrier to the use of MDF for shutter construction has been the splitting of the louver when attaching the tilt bar to the louver using this conventional technique. A drilling jig is made of a hardened steel plate with guild holes pattered to copy the exact pattern of the staple holes in a stacked pattern of multiple louver units. This jig allows a simple "pre-drill" process followed by hand gluing of the staples into the louvers, as described below.

Figure 13:
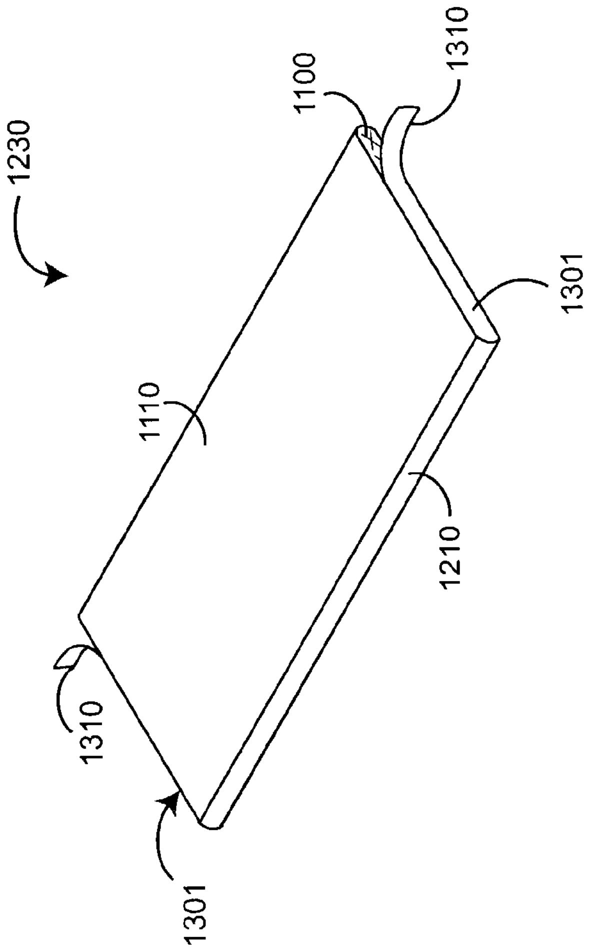
FIG. 13 is a perspective view of a laminated component.

As shown in FIG. 10A, yet a further processing step includes milling, sanding and laminating shutter component ends 1018, described in further detail with respect to FIG. 13. As shown in FIG. 13, a prefinished component 1230 has cut ends 1301 with an exposed core 1100. A second laminate 1310 is also applied to these ends 1301. This step is advantageously applied to a louver 700 (FIGS. 7A–D) after drilling so as to avoid damage to the finish. In an alternative embodiment, a louver end may be capped, as described with respect to FIGS. 17–18, below.

Shutter Assembly

Conventionally, wood shutters are finished after they are assembled. The assembly process of the present invention advantageously utilizes modern laminating materials to finish the shutter components in bulk prior to shutter assembly, as described with respect to FIG. 10A, above.

Figure 7A:
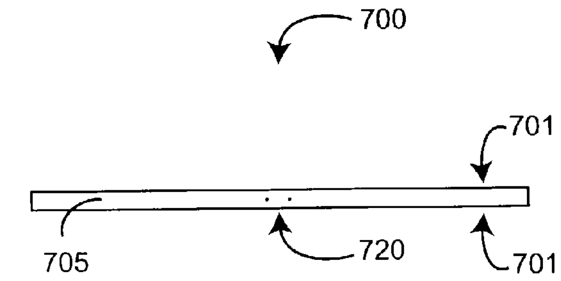
FIGS. 7A–D are leading edge, perspective, top and end views of a louver.
Figure 7B:
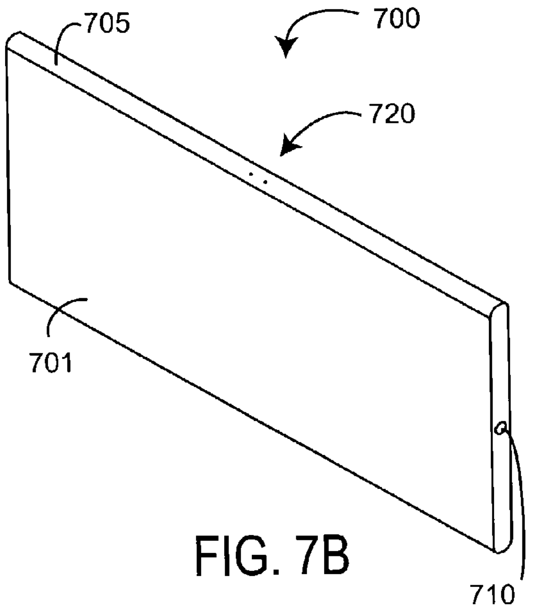
Figure 7C:
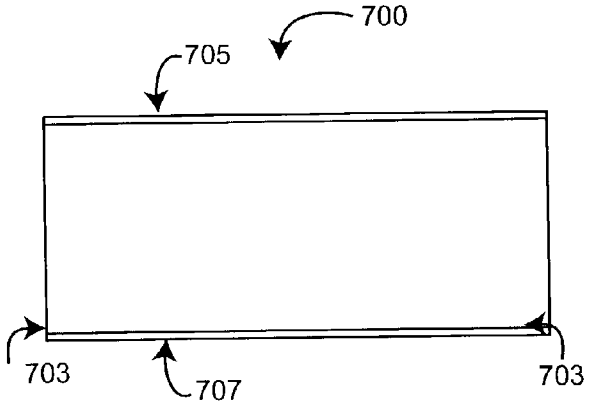
Figure 7D:
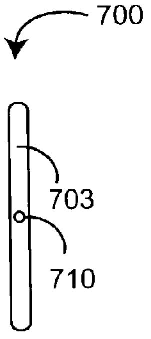
Figure 8A:
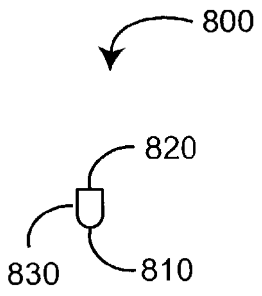
FIGS. 8A–D are end, perspective, front edge and side views of a tilt bar.
Figure 8B:
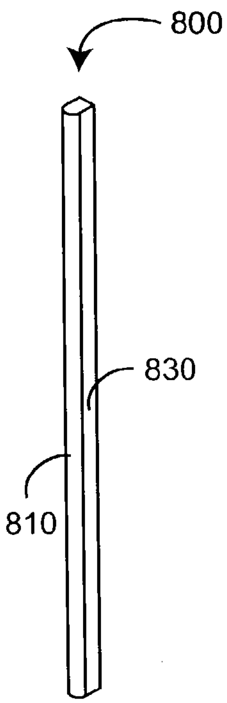
Figure 8C:
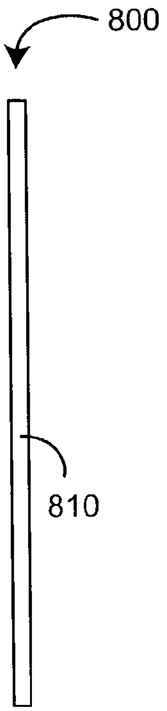
Figure 8D:
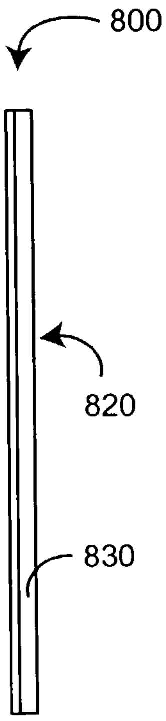

As shown in FIG. 10B, after shutter component prefinishing steps are completed, a shutter assembly process can be initiated. Shutter assembly includes the steps of installing anchors in selected louvers 1052, installing louver pins 1054 and positioning the shutter components 1058. During the installing anchors step 1052, an anchor 900 (FIGS. 9A–B) is installed into a louver pin hole 710 (FIG. 7B) by placing standard wood glue into the pin hole 710 (FIG. 7B) and threading the anchor 900 (FIGS. 9A–B) into the pin hole 710 (FIG. 7B). The glue is then allowed to set for a period of 1 hour. During the installing louver pins step 1054, ends of the louver pins 210 (FIG. 2) are press-fitted into the non-anchored louver pin holes 710 (FIG. 7B) prior to attachment of the stiles 500 (FIG. 2) to the spreaders 600 (FIG. 2). During the positioning shutter components step 1058, stiles 500 (FIGS. 5A–D) and spreaders 600 (FIGS. 6A–E) are positioned for assembly of a shutter frame 102 (FIG. 1) and louvers 700 (FIGS. 7A–D) are positioned between the stiles 500 (FIGS. 5A–D), as described with respect to FIG. 2, above.

Also shown in FIG. 10B, another assembly step is gluing and clamping a shutter frame around the positioned louver components 1062. Conventional custom shutters are typically constructed with dowels and/or screws attaching the spreaders to the stiles. This convention shutter assembly method would cause MDF material to split. The shutter frame assembly step 1062 according to the present invention advantageously utilizes tongue and groove construction for assembly of the stiles 500 (FIGS. 5A–D) and spreaders 600 (FIGS. 6A–E), which avoids MDF material splitting. Spreader tongues 610 (FIGS. 6A–E) are configured to insert into corresponding stile grooves 510 (FIGS. 5A–D). Prior to stile-spreader attachment, standard wood glue is applied to the tongue outer surfaces and the groove inner surface. During attachment, the unattached ends of the louver pins 210 (FIG. 2) are placed into corresponding stile pin holes 530 (FIG. 5D). The shutter frame assembly is then pressed together and clamped, and the tongue-groove glue allowed to cure for a period of 1 hour.

Further shown in FIG. 10B is an inserting tensioning screws step 1064. Each louver 700 (FIGS. 7A–D) having anchors 900 (FIGS. 9A–B) is attached to the stiles 500 (FIGS. 5A–D) with tensioning screws 230 (FIG. 2) inserted into the stile adjustment holes 550 (FIG. 5B), pushed through the corresponding stile pin holes 530 (FIG. 5D) and threaded into corresponding anchors 900 (FIGS. 9A–B). In this manner, each louver 700 (FIGS. 7A–D) is mounted between stiles 500 (FIGS. 5A–D) with louver pins 210 (FIG. 2) retained in the louver pin holes 710 (FIG. 7B) and rotatably mounted within corresponding stile pin holes 530 (FIG. 5D). Selected louvers 700 (FIGS. 7A–D) are instead mounted with tensioning screws 230 (FIG. 2) threaded into and retained by anchors 900 (FIGS. 9A–B), as described with respect to FIG. 2.

As shown in FIG. 10B, a tilt bar 800 (FIGS. 8A–D) is attached to louvers 700 (FIGS. 7A–D) during the steps of stapling links to a tilt bar 1068 and gluing louver links into link holes 1074. During the stapling links step 1068, tilt bar links 240 (FIG. 2) are inserted into a natural wood tilt bar 800 (FIGS. 8A–D), such as with a conventional staple gun as is well-known in the art. Although links can be stapled directly into a natural wood tilt bar, this conventional attachment method would split an MDF louver. A gluing louver links step 1074 advantageously utilizes predrilled link holes 720 (FIGS. 7A–B) and glue to avoid splitting MDF louvers. Standard wood glue is applied to louver links 250 (FIG. 2), which are manually threaded through the attached tilt bar links 240 and inserted into the link holes 720 (FIGS. 7A–B).

Additionally shown in FIG. 10B, the shutter assembly steps include assembling a window frame 1078 and mounting a shutter to a window frame 1084. During the assembling window frame step 1078, a window frame is assembled in a conventional manner using a partially wrapped, natural, finger-jointed wood, as described with respect to FIG. 4, above. During a mounting shutter to window frame step 1084, hinges 310 (FIG. 3) are mounted to a stile edge and an inside edge of the assembled window frame, as shown in FIG. 3, above, and the assembled shutter 100 (FIG. 3) is attached to the assembled window frame 400 (FIG. 3).

A hinging jig (not shown) is utilized to pre-drill pilot holes to permit screws to affix a hinge to MDF materials that otherwise could not be utilized due to the cracking and/or splitting characteristics found in the use of MDF. The jig allows the use of a thinner, less costly material for construction of the shutter than is considered standard in the industry. The jig also allows a pre-drilling of holes in an exact manner without drilling out through the sides of the material. The jig is made of a hardened steel plate with guild holes pattered to copy the exact pattern of the hinge screw holes. The jig is made with an oblong slotted hole to be used for alignment to a channel bar. The channel bar has pre-drilled/tapped holes each spaced by 1", for a total length that permits multiple plates to be aligned along the bar. The pre-drilling plates are affixed to the channel bar using a wing nut bolt. In this manner, multiple shutter panels can be pre-drilled with identical settings.

ADDITIONAL EMBODIMENTS

Figure 16A:
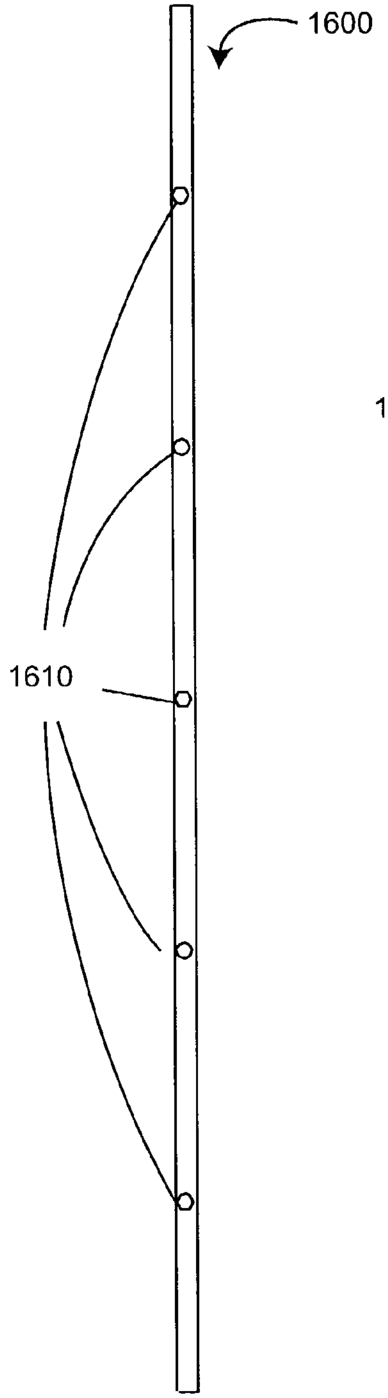
FIGS. 16A–D are front, side, end and detailed end views, respectively, of a groove insert.
Figure 16B:
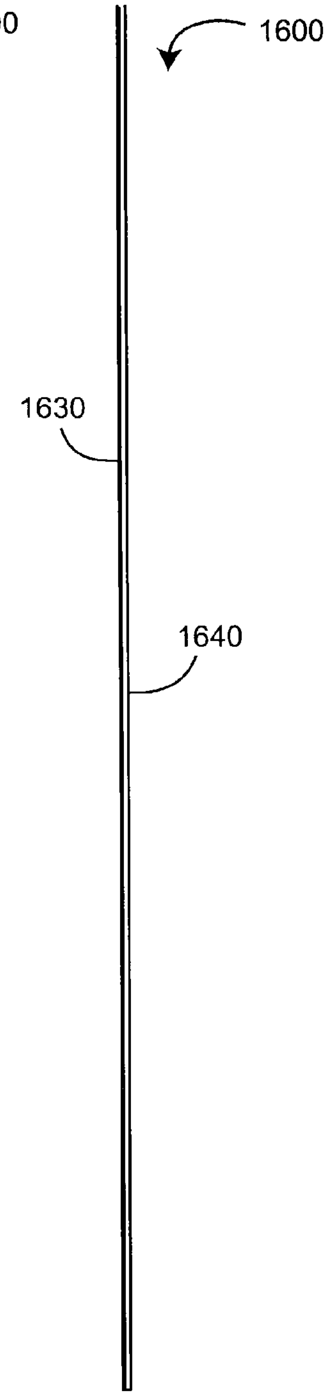
Figure 16C:
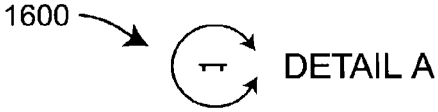
Figure 16D:
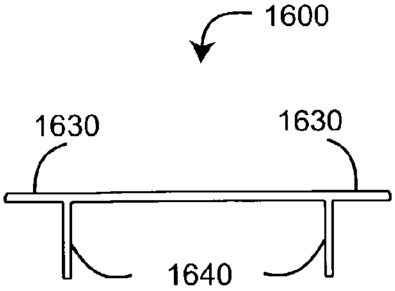

FIGS. 14A–G illustrate a full groove stile embodiment 1400, including a stile base 1500 (FIGS. 15A–C) and a groove insert 1600 (FIGS. 16A–C). An assembled full groove stile 1400 corresponds generally in configuration and function to the partial groove stile 500 (FIGS. 5A–D), described above. A pair of stiles 1400 provide mounts for louvers 700 (FIG. 1), having a number of pin holes 1610 spaced at regular intervals along the inside edge 1507 and configured to receive louver pins 210 (FIG. 2). Also, the stile 1400 has one or more tension adjustment holes 1550 configured to accept a tensioning screw 230 (FIG. 2) for louver tension control and frame stabilization, as described above.

As shown in FIGS. 14A–G, the full groove stile 1400 differs from the partial groove stile 500 (FIGS. 5A–D) in several respects. Advantageously, the full groove stile 1400 has two subcomponents, a stile base 1500 and a groove insert 1600. The stile base 1500 has an end-to-end groove 1510 instead of end-proximate partial grooves 510 (FIGS. 5A–D). This full groove 1510 can be cut in a single manufacturing step across several stiles 1400 instead of the two groove cuts required at each end for the partial groove stile 500 (FIGS. 5A–D). Further, the pin holes 1610 are located on the groove insert 1600, eliminating another manufacturing step required to drill pin holes 530 (FIG. 5D) in each stile 500 (FIGS. 5A–D). The insert 1600 is sized and positioned within the groove 1510 so as to provide a groove portion at each end 1503 configured to receive the spreader tongues 610 (FIGS. 6A– E), as described above. The stile base 1500 and groove insert 1600 are described in further detail with respect to FIGS. 15–16, below.

FIGS. 15A–D illustrate a stile base 1500, which is a generally elongated, planar shutter component having ends 1503, an outside edge 1505 and an inside edge 1507. A groove 1510 extends between the ends 1503 for the full length of the stile base 1500. In a particular embodiment, the stile base 1500 is prefinished over an MDF core and dimensioned as to overall length, width and thickness; groove width and depth; and tensioning hole 1550 length and diameter as described with respect to the partial groove embodiment shown in FIGS. 5A–D, above.

Figure 14A:
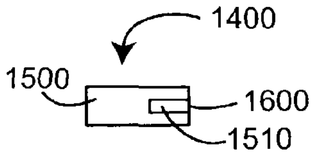
FIGS. 14A–G are end, front, inside edge, perspective, exploded inside edge perspective, exploded outside edge perspective and detailed end views, respectively, of a full groove stile.
Figure 14B:
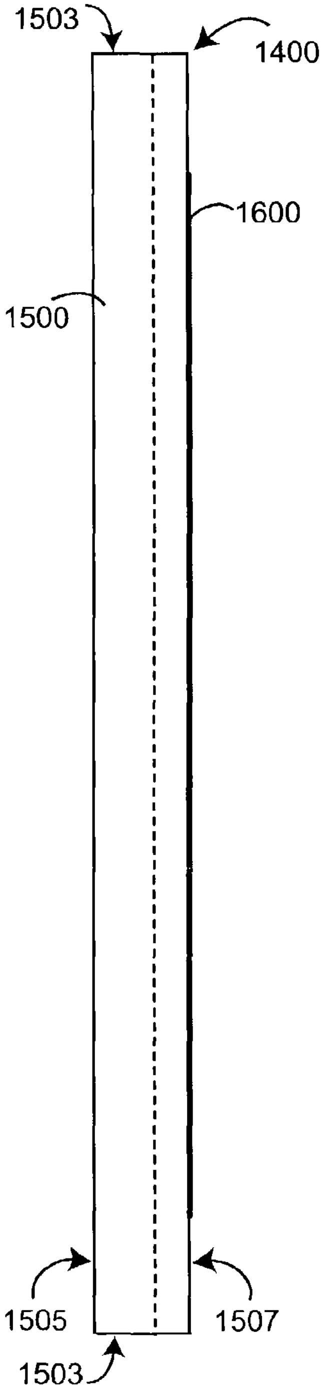
Figure 14C:
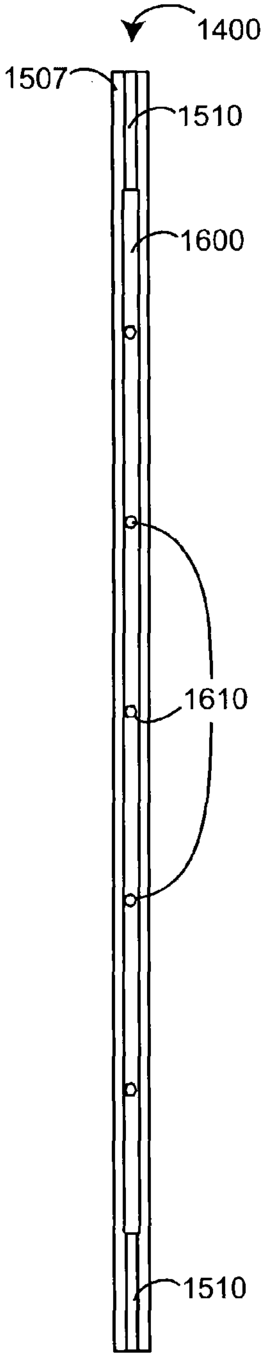
Figure 14D:
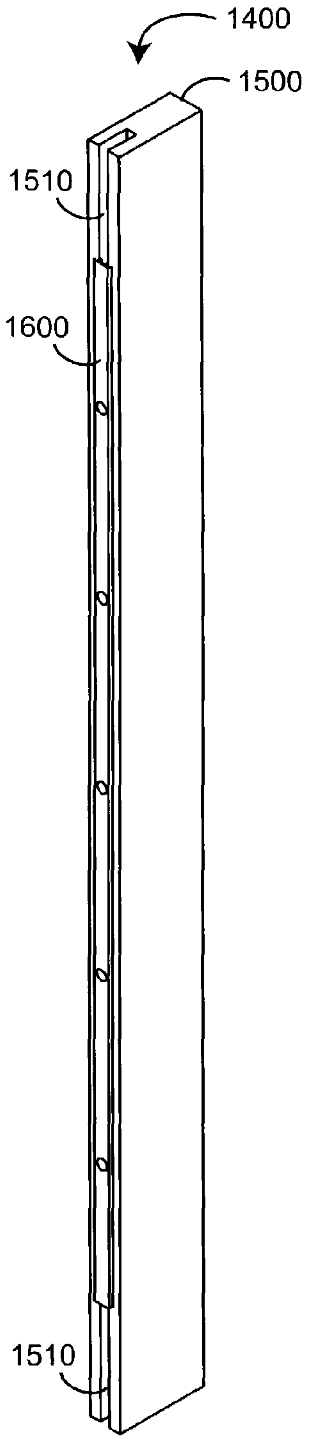
Figure 14E:
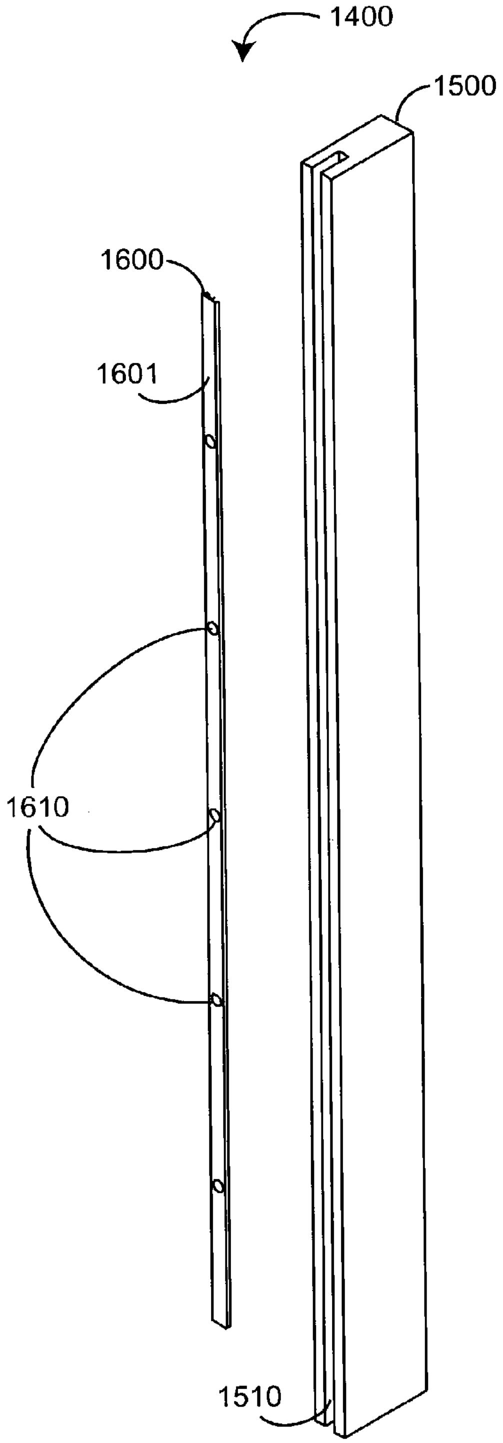
Figure 14F:
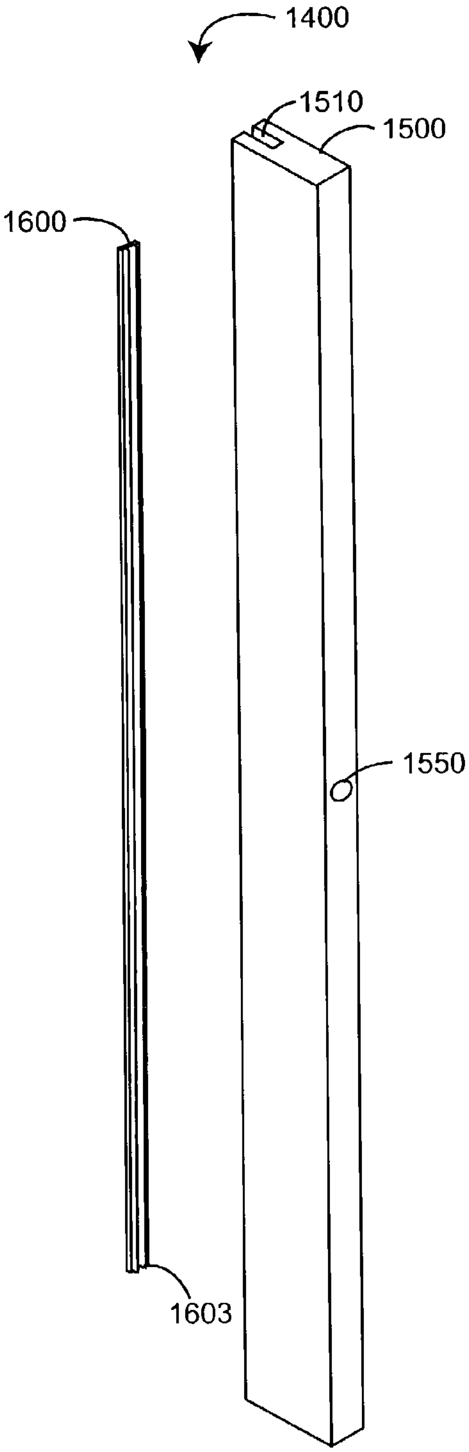
Figure 14G:
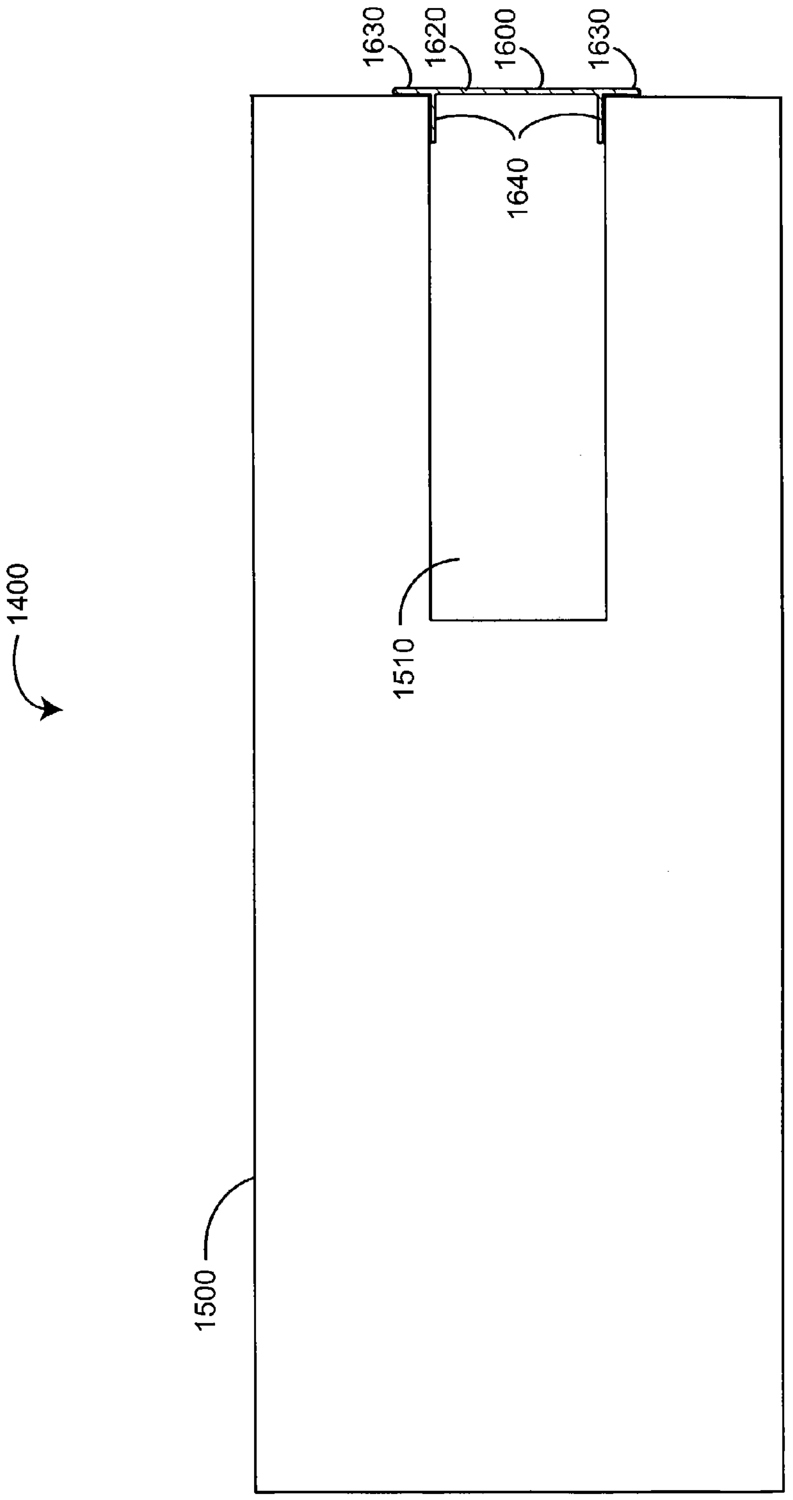
Figure 15A:
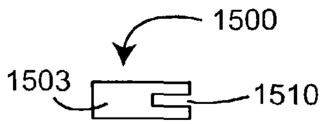
FIGS. 15A–D are end, outside edge, front and inside edge views, respectively, of a full groove stile base.
Figure 15B:
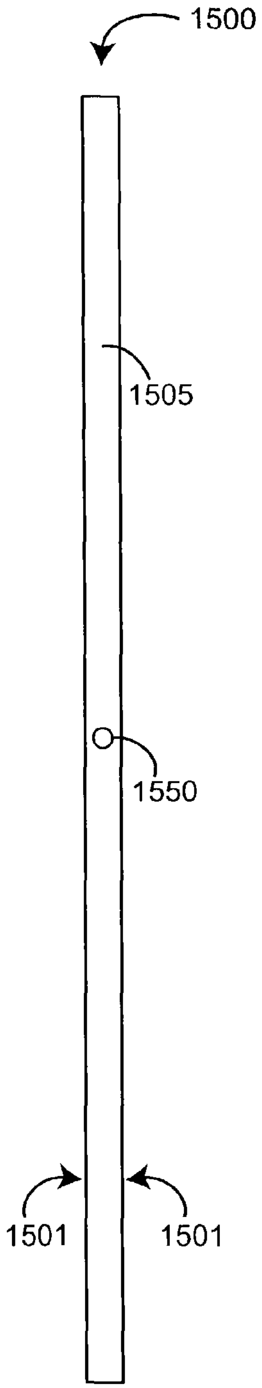
Figure 15C:
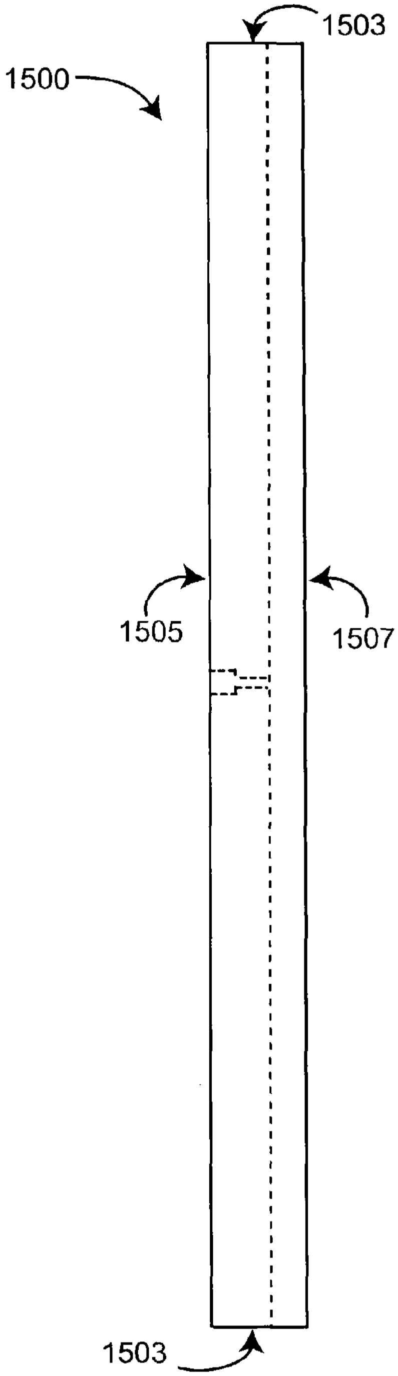
Figure 15D:
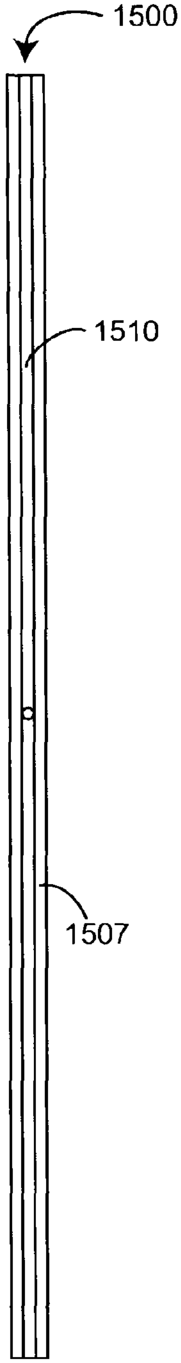

FIGS. 16A–D illustrate a groove insert 1600, which is configured to fit within the stile base groove 1510 (FIGS. 14E–G) generally midway between the stile base ends 1503 (FIG. 14B). The insert 1600 is an elongated subcomponent having a shelf 1630 and legs 1640. The installed insert 1600 is configured so that the shelf 1630 rests along the stile base inside edge 1507 (FIGS. 15A–D) and the legs 1640 provide a friction fit along the inside of the stile base groove 1510 (FIG. 14G). The pin holes 1610 are dimensioned to accept louver pins 210 (FIG. 2) or a louver end cap 1800 (FIGS. 18A–C), as described below. In one embodiment, the insert 1600 is a single section of extruded plastic or similar flexible material that is cut to length to accommodate a particular stile base 1500 (FIGS. 15A–D). In another embodiment, the insert 1600 has multiple sections of extruded plastic that snap together or are otherwise fitted together to accommodate a particular stile base 1500 (FIGS. 15A–D). One of ordinary skill in the art will recognize that various extruded cross-sections other than the cross-section 1620 shown in FIG. 14G may be utilized to press-fit into the stile base groove 1510 (FIG. 14G) and are contemplated to be within the scope of the present invention.

Figure 17A:
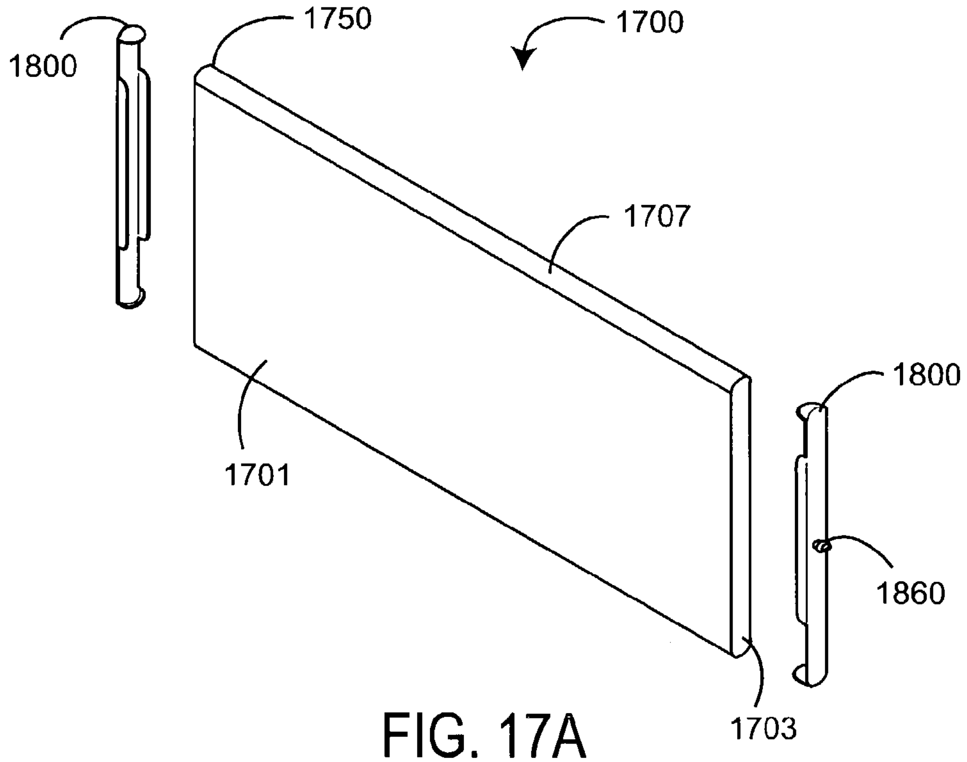
FIGS. 17A–B are exploded perspective and perspective views, respectively, of a capped louver.
Figure 17B:
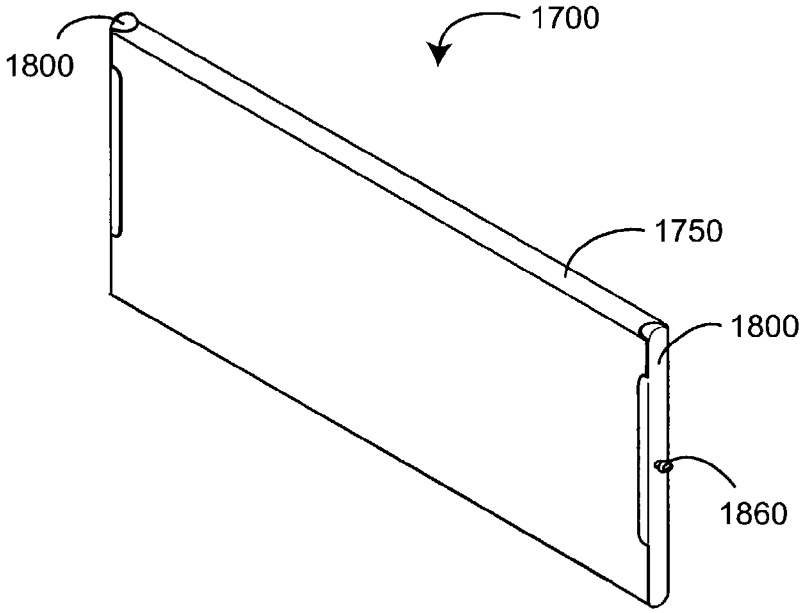

FIGS. 17A–B illustrate a capped louver embodiment 1700, including a louver base 1750 and louver end-caps 1800. An assembled capped louver 1700 (FIG. 17B) corresponds generally in function to an uncapped louver embodiment 700 (FIGS. 7A–D), described above. Multiple capped louvers 1700 are rotatably mounted within an assembled shutter frame 102 (FIG. 1) and extend horizontally between stiles 500 (FIG. 1). A louver base 1750 corresponds to an uncapped louver 700 (FIGS. 7A–D) in configuration and dimensions, as described above, except that it does not have pin holes 710 (FIG. 7B) and does not accept louver pins 210 (FIG. 2). In one embodiment, a louver base 1750 is constructed of a core material with a first laminate applied to the louver faces 1701 and a second laminate applied to the louver edges 1705, 1707. No laminate is applied to the louver ends 1703. Instead, the louver base 1750 is removably attached to louver end caps 1800 so that the ends 1703 are covered. In a particular embodiment, the core material is MDF, the first laminate is a decorative paper, and the second laminate is a heat transfer foil, as described with respect to FIGS. 5A–D, above. In another embodiment (shown) the louver base 1750 does not have link holes 720 (FIGS. 7A–B) for tilt bar attachment. Instead, the end caps 1800 are adapted to attach to a link bar 1900 (FIG. 19), as described below. The end caps 1800 are described in further detail with respect to FIGS. 18A–C, below.

As shown in FIGS. 17A–B, a capped louver 1700 advantageously reduces manufacturing steps and parts by eliminating pin holes 710 (FIG. 7B) and louver pins 210 (FIG. 2), and, in one embodiment, link holes 720 (FIGS. 7A–B) and associated links 240, 250 (FIG. 2). A further advantage is that the louver base 1750 can be removed from the end caps 1800. Hence, an assembled shutter as described with respect to FIG. 19, below, allows louvers to be easily cleaned and damaged louvers to be replaced. Pin holes 710 (FIGS. 7A–B) can be pre-drilled and anchors 900 (FIGS. 9A–B) installed in one or more selected louver base(s) 1750 so as to provide louver tension control and frame stabilization, as described above. In that case, louver caps 1800 are installed with holes in place of the snap-fit buttons 1860 (FIG. 18B), as described below.

Figure 18A:
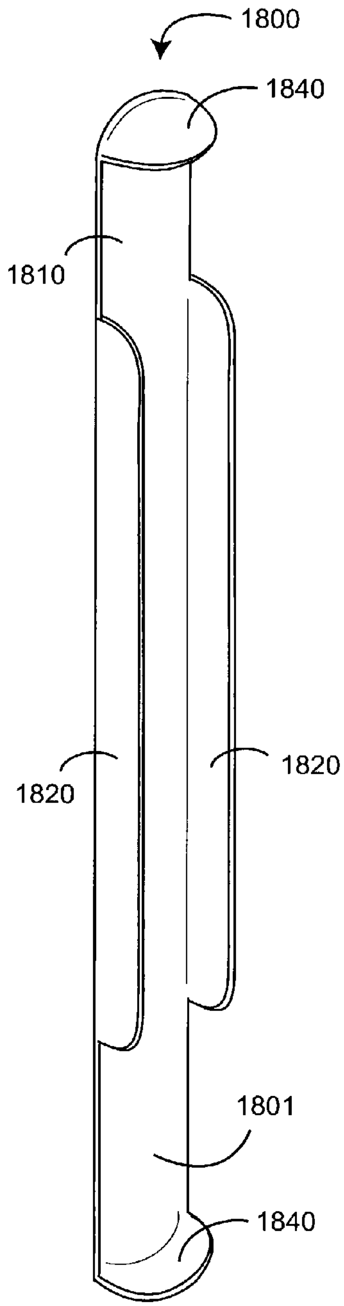
FIGS. 18A–C are inside face perspective, outside face perspective, and alternative embodiment outside face perspective views, respectively, of a louver end cap.
Figure 18B:
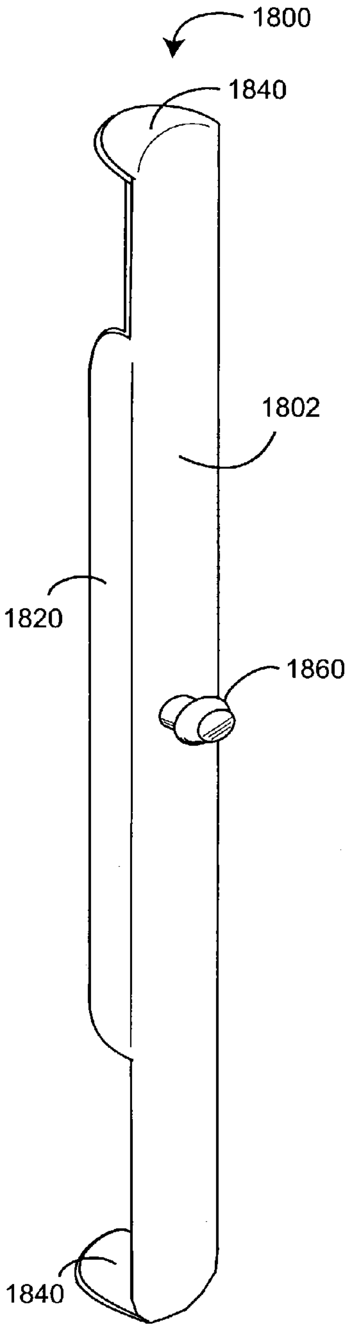
Figure 18C:
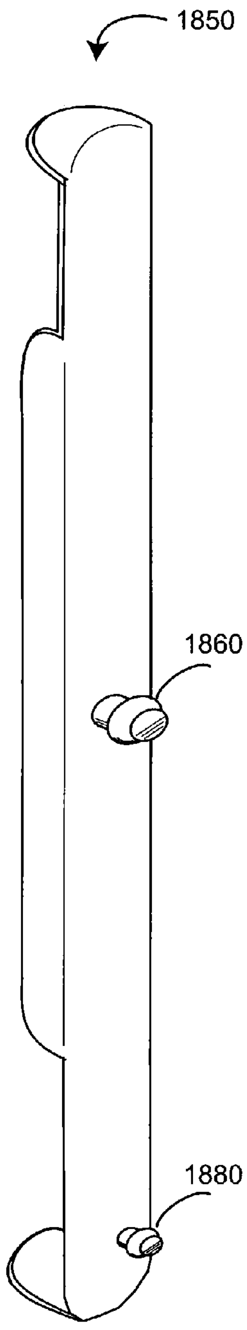

FIGS. 18A–C illustrate a louver end cap 1800, which is adapted to removably attach to a louver base 1750 (FIGS. 17A–B). The end cap 1800 has a cap body 1810, side flaps 1820, end flaps 1840, a snap-fit stile button 1860 and an optional snap-fit link bar button 1880. The cap body 1810 is generally planar with an inside face 1801 and an outside face 1802. The cap body 1810 is adapted to cover a louver base end 1703 (FIG. 17A) so that the inside face 1801 is proximate the louver base 1703 and the outside face 1802 is distal the louver base 1703. The side flaps 1820 and end flaps 1840 extend normal to the body 1810 from the inside face 1801 and are configured so that the side flaps 1820 grip the louver base faces 1701 (FIG. 17A) and the end flaps 1840 grip the louver base edges 1707 (FIG. 17A). Accordingly, an end cap 1800 is constructed of a material having some flexibility, such as a thin plastic, so that one or more of the side flaps 1820 and end flaps 1840 can be deflected for attachment or detachment to a louver base 1750. In an alternative embodiment, not shown, the side flaps 1820 or end flaps 1840 or both are replaced by a wedge, prongs or similar structure extending from the center of the inside face 1801 and adapted to insert into, and fixedly attached to, a louver base edge 1703 (FIG. 17A).

As shown in FIGS. 18B–C, the snap-fit stile button 1860 is adapted to press fit into and lock inside a stile pin hole 1610 (FIG. 14C) so that a louver base 1750 (FIGS. 17A–B) can be removably attached between stiles 1400 (FIGS. 14A–D), as described with respect to FIG. 19, below. An optional snap-fit link bar button 1880 is adapted to press fit into and hold within a link bar hole 1910 (FIG. 19) so that a link bar 1900 can connect multiple louvers 1700 (FIGS. 17A–B), as described with respect to FIG. 19, below. In one embodiment, the snap-fit buttons 1860, 1880 extend normally from the end cap outside face 1802 and have a catch that snaps and locks inside a pin hole 1610 or link bar hole 1910, respectively.

Figure 19:
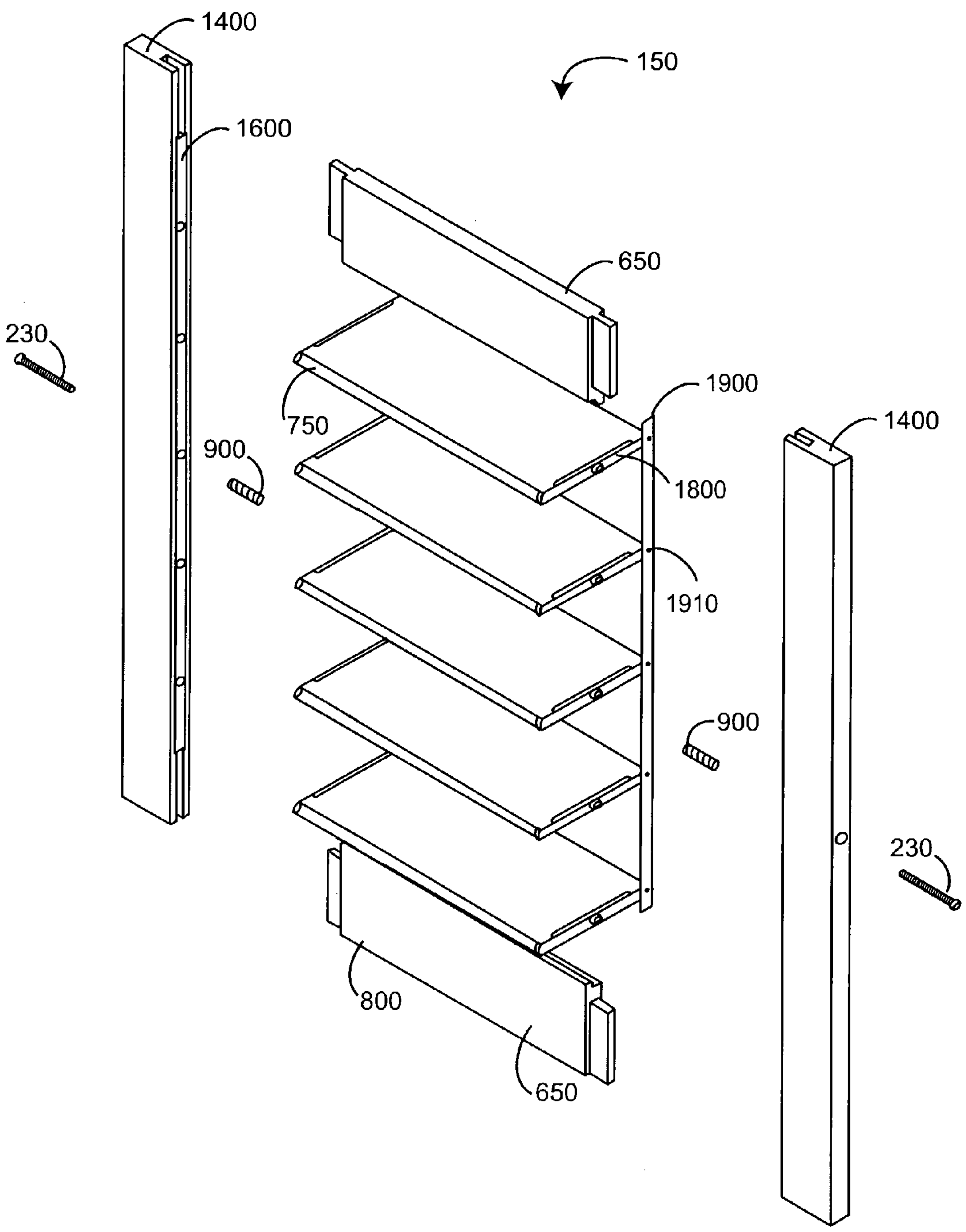
FIG. 19 is an exploded perspective view of an alternative embodiment prefinished MDF shutter.

FIG. 19 illustrates a rear-linked shutter embodiment 150 utilizing full groove stiles 1400 and capped louvers 1700. The rear-linked shutter 150 does not have a tilt bar 800 (FIG. 2), but instead has a link bar 1900. The link bar 1900 has multiple link bar holes 1910 adapted to attach to each of multiple louvers 1700 via snap-fit buttons 1880 (FIG. 18C). In one embodiment, the link bar 1900 is constructed of a thin planar, elongated, flexible material, such as plastic, and adapted to fit in the space between the louvers 1700 and stiles 1400. Advantageously, the view through the shutter 150 is not blocked by a tilt bar. Instead, the louvers 1700 are opened and closed by moving an individual louver 1700, which moves all louvers via the link bar 1900. Another advantage is that a tilt bar notch is eliminated in the top spreader, so that the spreaders 650 are the same part, reducing the number of parts and shutter manufacturing steps.

Although a prefinished shutter has been described above in terms of an MDF substrate, one of ordinary skill in the art will recognize that the teachings disclosed herein may be applied to other substrates that have surfaces capable of taking modern finishes and that are sufficiently durable to be prefinished without surface damage during assembly. The use of any such substrates for a prefinished shutter are intended to fall within the scope of the present invention. Further, although a prefinished shutter has been described above in terms of laminate coatings, one of ordinary skill in the art will also recognize that other durable and maintainable coatings fall within the scope of the present invention.

A prefinished fiberboard shutter has been disclosed in detail in connection with various embodiments. These embodiments are disclosed by way of examples only and are not to limit the scope of the claims that follow. One of ordinary skill in the art will appreciate many variations and modifications.

What is claimed is:

1. A shutter manufacturing method comprising the steps of:

applying a first laminate to a surface of a substrate to form a laminated sheet;

cutting said laminated sheet to a predetermined width to form a laminated board;

cutting said laminated board to a predetermined length to form a prefinished shutter component; and assembling said prefinished shutter component into a shutter.

2. The shutter manufacturing method according to claim 1 further comprising the steps of:

cutting said laminated sheet at said predetermined width to form a second laminated board; and cutting one of said laminated board and said second laminated board at said predetermined length to form a second prefinished shutter component; and assembling said second prefinished shutter component into said shutter.

3. The shutter manufacturing method according to claim 1 further comprising the steps of:

milling an edge of said laminated board to form a milled edge; and applying a second laminate to said milled edge.

4. The manufacturing method according to claim 3 wherein:

said substrate is manufactured wood; and said prefinished shutter component is a generally planar louver.

5. The shutter manufacturing method according to claim 4 further comprising the steps of:

drilling a link hole into said milled edge; and gluing a link into said link hole.

6. A shutter manufacturing method comprising the steps of:

providing a laminated manufactured wood substrate sheet;

identifying a plurality of attached shutter components configured edge-to-edge and end-to-end so as to comprise said substrate sheet;

separating said attached shutter components into a plurality of prefinished shutter components; and incorporating said prefinished shutter components into a shutter assembly.

7. The shutter manufacturing method according to claim 6 wherein said separating step comprises the substeps of:

cutting along edge portions of said attached shutter components; and cutting along end portions of said attached shutter components.

8. The shutter manufacturing method according to claim 7 further comprising the step of milling said edge portions of said attached shutter components.

9. The shutter manufacturing method according to claim 8 further comprising the step of laminating said edge portions of said attached shutter components.

10. The shutter manufacturing method according to claim 9 further comprising the step of laminating said end portions so as to provide a plurality of generally planar, prefinished louvers.

* * * * *